US008866913B1

(12) United States Patent
Hsieh et al.

(10) Patent No.: US 8,866,913 B1
(45) Date of Patent: Oct. 21, 2014

(54) SYSTEMS AND METHODS FOR CALIBRATION OF A 360 DEGREE CAMERA SYSTEM

(71) Applicant: OmniVision Technologies, Inc., Santa Clara, CA (US)

(72) Inventors: Jeff Hsieh, Los Altos, CA (US); Hasan Gadjali, Fremont, CA (US); Tawei Ho, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/248,136

(22) Filed: Apr. 8, 2014

Related U.S. Application Data

(60) Provisional application No. 61/809,602, filed on Apr. 8, 2013.

(51) Int. Cl.
*H04N 17/00* (2006.01)
*H04N 17/02* (2006.01)

(52) U.S. Cl.
CPC .................................. *H04N 17/002* (2013.01)
USPC ................. 348/187; 348/36; 348/47; 348/48; 348/73; 348/94; 348/153; 348/154; 348/159; 348/169; 348/174; 348/175; 348/188; 348/207.99; 348/207.1; 348/208.14; 348/208.16; 348/211.6; 348/211.14; 348/218.1; 348/231.3; 348/231.6; 348/239; 348/240.99; 348/240.2; 348/347; 348/383; 348/523; 348/567; 348/716; 348/719

(58) Field of Classification Search
USPC .......... 348/187, 36, 47, 48, 73, 94, 153, 154, 348/159, 169, 174, 175, 188, 207.99, 207.1, 348/208.14, 208.16, 211.6, 211.14, 218.1, 348/231.3, 231.6, 239, 240.99, 240.2, 347, 348/383, 523, 567, 716, 719
See application file for complete search history.

(56) References Cited

U.S. PATENT DOCUMENTS

| 7,542,073 | B2* | 6/2009 | Li et al. ...................... 348/218.1 |
| 7,583,288 | B2* | 9/2009 | Uyttendaele et al. ........... 348/36 |
| 8,311,366 | B2* | 11/2012 | Schiewe et al. ............... 382/294 |
| 2004/0233274 | A1* | 11/2004 | Uyttendaele et al. ........... 348/36 |
| 2006/0187305 | A1* | 8/2006 | Trivedi et al. ................. 348/169 |
| 2006/0268131 | A1* | 11/2006 | Cutler .......................... 348/239 |
| 2007/0024712 | A1* | 2/2007 | Morita et al. ................. 348/187 |
| 2010/0182398 | A1* | 7/2010 | Mazzilli ......................... 348/36 |
| 2010/0231687 | A1* | 9/2010 | Amory et al. .................. 348/36 |
| 2011/0134209 | A1* | 6/2011 | Schmidt ......................... 348/38 |
| 2011/0157373 | A1* | 6/2011 | Ye et al. ........................ 348/187 |
| 2012/0050543 | A1* | 3/2012 | Colla et al. .................... 348/187 |
| 2012/0081503 | A1* | 4/2012 | Leow et al. ................. 348/14.07 |
| 2013/0201307 | A1* | 8/2013 | Schloter et al. ................. 348/61 |
| 2013/0265450 | A1* | 10/2013 | Barnes, Jr. ................... 348/207.1 |

* cited by examiner

*Primary Examiner* — Jefferey Harold
*Assistant Examiner* — Mustafizur Rahman
(74) *Attorney, Agent, or Firm* — Lathrop & Gage, LLP

(57) ABSTRACT

Systems and methods for calibrating a 360 degree camera system include imaging reference strips, analyzing the imaged data to correct for pitch, roll, and yaw of cameras of the 360 degree camera system, and analyzing the image data to correct for zoom and shifting of the cameras. Each of the reference strips may include a bullseye component and a dots component to aid in the analyzing and correcting.

20 Claims, 23 Drawing Sheets

SYSTEMS AND METHODS FOR CALIBRATION OF A 360 DEGREE CAMERA SYSTEM

RELATED APPLICATIONS

This application claims priority to U.S. Provisional Application Ser. No. 61/809,602, filed Apr. 8, 2013 and which is incorporated by reference herewith in its entirety.

FIELD OF INVENTION

This invention is in the field of camera system calibration. More specifically, it relates to setting up multiple cameras, and then calibrating all the cameras to ensure that they are properly aligned with each other so that they may be integrated as a camera system.

BACKGROUND

Camera systems that include multiple cameras are useful in areas such as surveillance, conferencing and automotive. Typically, a number of cameras, each covering a viewing space, provide individual images that are then combined into a panoramic view. Calibration is often needed to properly align the cameras to form an integrated system.

SUMMARY

In a first aspect is described a method of calibrating a 360 degree camera system having a plurality of cameras, including: placing the 360 degree camera system at a first location; placing reference strips at respective additional locations, each additional location equidistant from the first location and each additional location corresponding to a viewing angle intersection between two adjacent cameras of the 360 degree camera system; adjusting the height of the 360 degree camera system such that the camera height is equal to the middle of the reference strips; capturing imaged data of two of the reference strips using each of the cameras; straightening imaged reference strips within the image data captured by a first camera of the plurality of cameras; and, matching the imaged reference strips imaged by the first camera to the image reference strips captured by each camera adjacent to the first camera.

In a second aspect is described a system for calibrating a 360 degree camera system having a plurality of cameras, the system including: a non-transitory memory including a database for storing image data captured by each of the plurality of cameras, the image data including imaged reference strips; a processor; a plurality of reference strips; calibration software stored within the memory as computer readable instructions executable by the processor, the calibration software configured to: analyze the image data to straighten the imaged reference strips within the imaged data captured by each of the plurality of cameras, and analyze the image data to match the imaged reference strips imaged by a first camera of the plurality of cameras to the imaged reference strips imaged by another of the plurality of cameras adjacent to the first camera.

DETAILED DESCRIPTION

Figure 1:
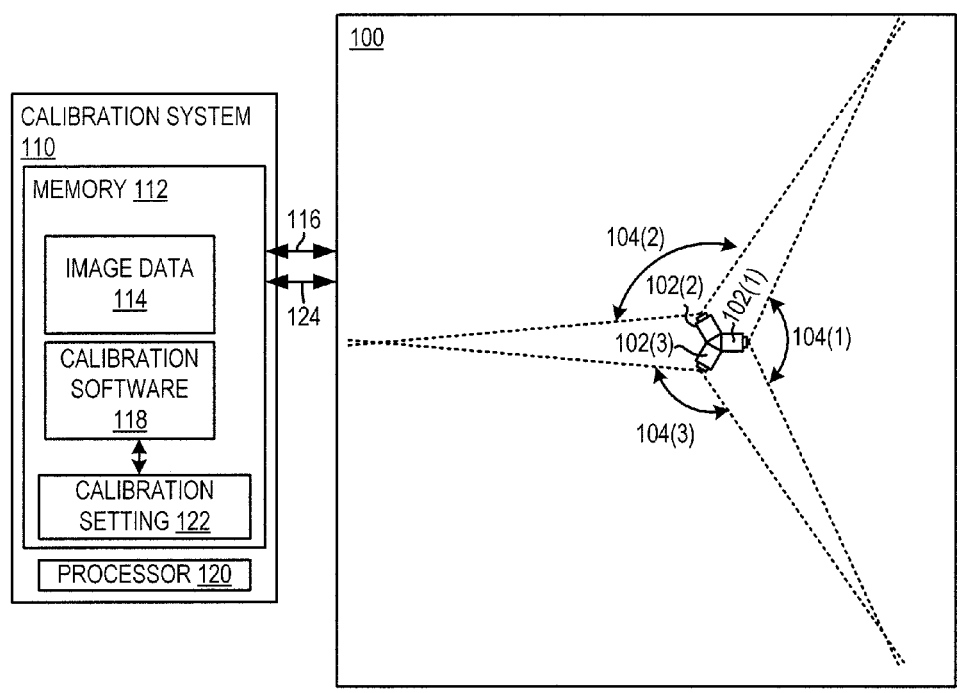
FIG. 1 depicts an exemplary a camera system for providing a 360 degree image of a surrounding scene and a calibration system for calibrating the camera system, in one embodiment.

The present disclosure may be understood by reference to the following detailed description taken in conjunction with the drawings briefly described below. It is noted that, for purposes of illustrative clarity, certain elements in the drawings may not be drawn to scale. Specific instances of an item may be referred to by use of a numeral in parentheses (e.g., camera 102(1)) while numerals without parentheses refer to any such item (e.g., dots 202).

FIG. 1 depicts an exemplary a camera system 100 for providing a 360 degree image of a surrounding scene and a calibration system 110 for calibrating the camera system 100, in one embodiment. Camera system 100 includes for example three cameras 102, each with a viewing angle 104 of 130 degrees (as indicated by the dashed lines). It should be appreciated that the viewing angle 104 of each camera 102 is illustrative, and that each camera may have a greater or lesser viewing angle than depicted. It is expected that the 360 degree camera system will have a total viewing angle of greater than or equal to 360 degrees, however, the viewing angle could be less than 360 degrees without departing from the scope hereof. Additionally, the viewing angles may not be the same for each camera, so long as the total viewing angle for all three cameras is at least 360 degrees.

All cameras 102 are positioned on the same leveled plane (i.e. a plane parallel to the plane defined by FIG. 1), with each camera 102 pointing outward and away from the other two cameras 102. Since the viewing angle for each camera is 130 degrees, there is a certain amount of overlap between the viewing areas of the cameras. Such overlap is needed in order to stitch together the images produced by these cameras to produce a final 360 degree panoramic view. Although FIG. 1 illustrates a three camera system, it should be appreciated that a camera system including more than three cameras will work in a similar fashion.

After cameras 102 are set up on a leveled plane, they will be calibrated so that they can later form integrated camera system 100. Calibration system 110 includes a memory 112 storing image data 114 received from inputs 116, and calibration software 118 for analyzing image data 114 to determine a calibration setting for each of camera 102. Software 118 comprises machine readable instructions stored within memory 112 and executable by processor 120 to generate calibration setting 122 and outputting calibration setting 122 via output 124. Two major calibration steps are needed. First, each camera is calibrated with a dot matrix chart in order to correct for image distortion due to the wide angle lens within the individual camera. Second, each camera is calibrated with reference strips in order to correct for pitch, roll, yaw, as well as zooming and shifting differences that exist between individual cameras.

Figure 2:
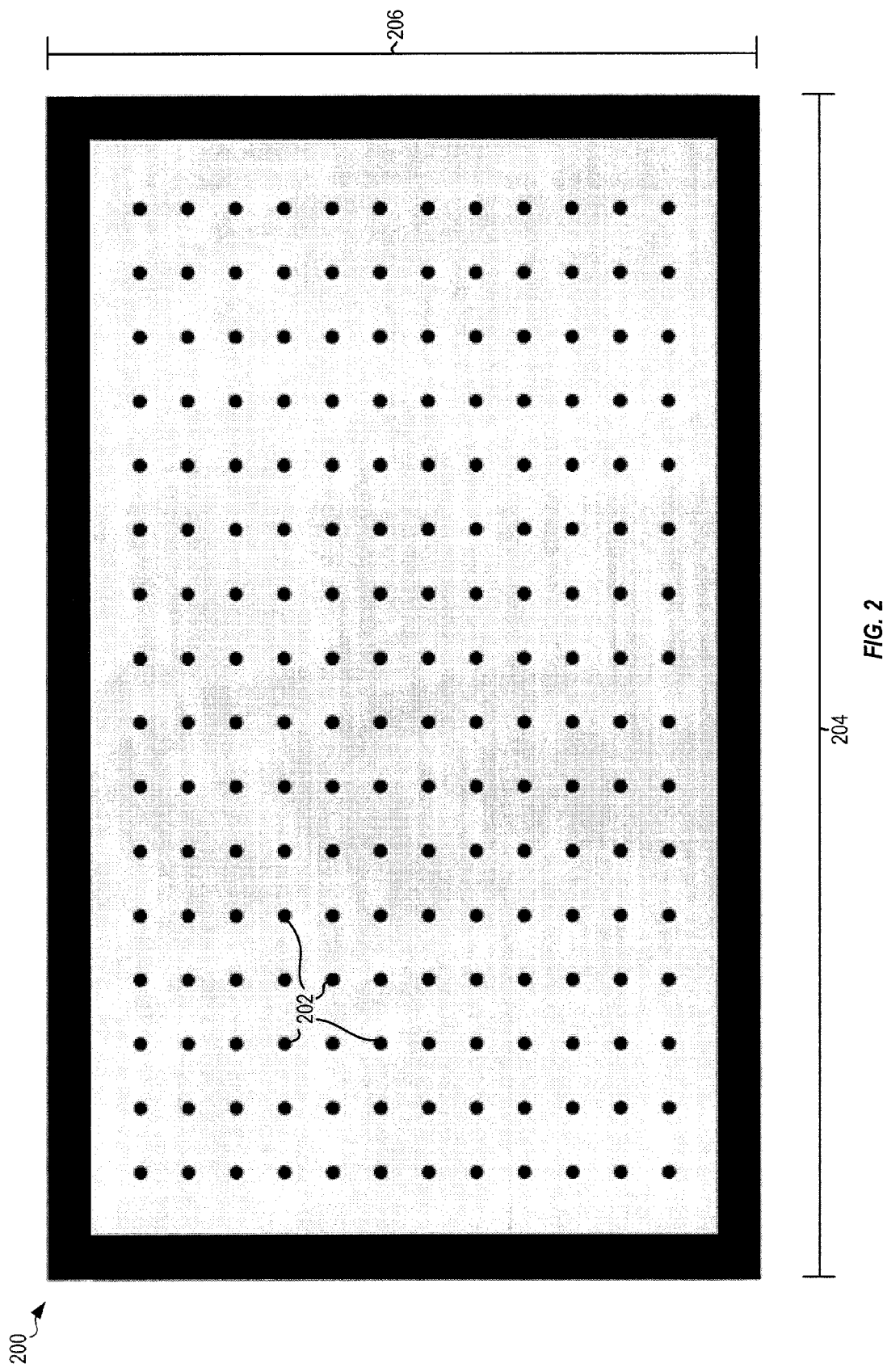
FIG. 2 depicts an exemplary dot matrix chart used for calibration of the 360 degree camera system of FIG. 1, in one embodiment.

FIG. 2 depicts an exemplary dot matrix chart 200 used for calibration of the 360 degree camera system 100 of FIG. 1, in one embodiment. Chart 200 includes a matrix of rows and columns of evenly spaced dots 202. For purposes of illustrative clarity, not all dots are labeled within FIG. 2. Chart 200 is useful to correct for image distortion due to the presence of wide angle lens within an individual camera (e.g. camera 102).

Figure 3:
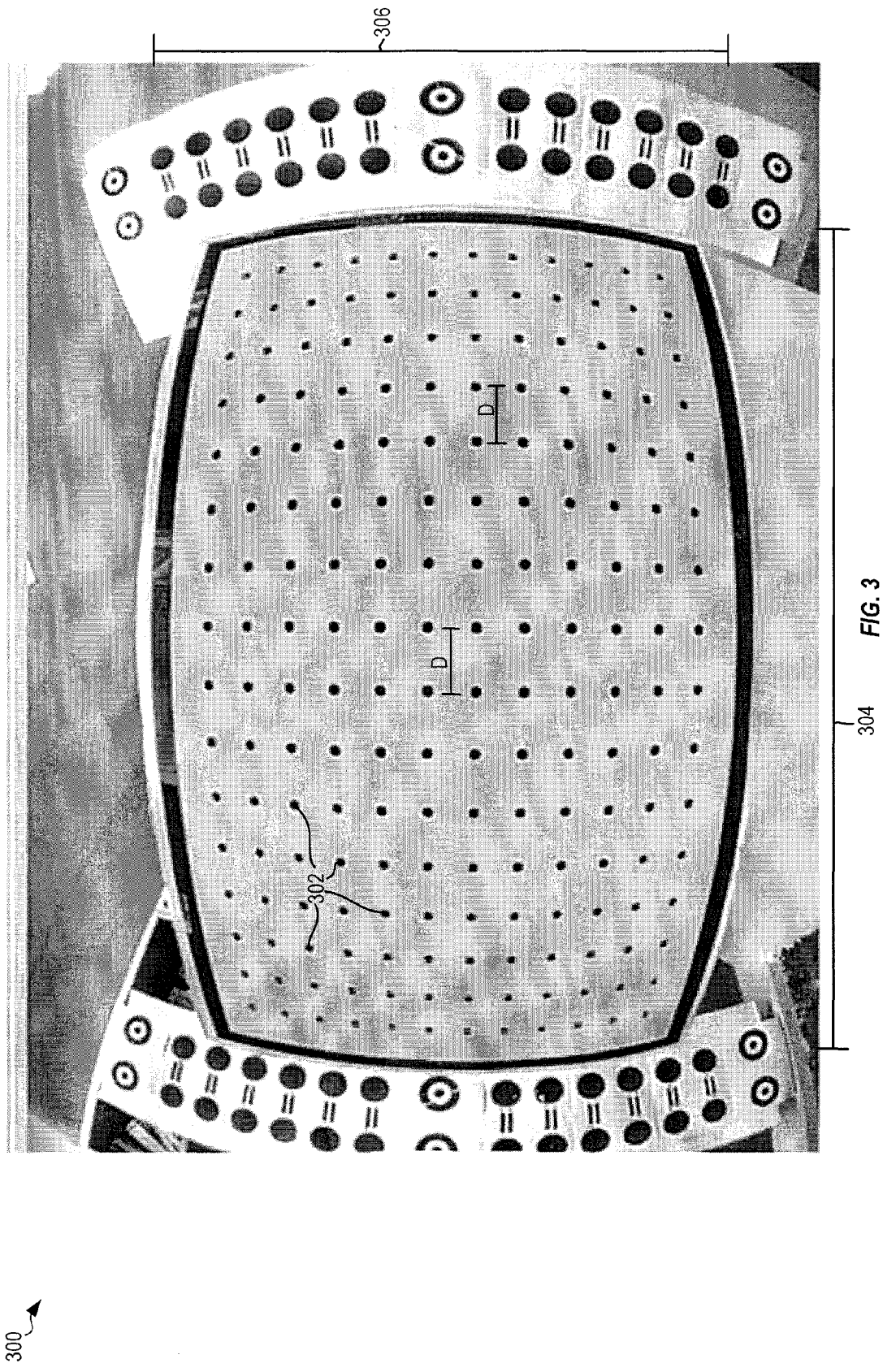
FIG. 3 depicts an exemplary imaged scene of dot matrix chart, of FIG. 2, wherein the use of a wide angle lens produces a distorted image.

FIG. 3 depicts an exemplary imaged scene of dot matrix chart 200, of FIG. 2, wherein the use of a wide angle lens produces a distorted image 300. Compared with FIG. 2, the distances "D" between the dots 302 in FIG. 3 are no longer spaced evenly. The contrast between FIG. 2 and FIG. 3 allows for the calculation of the amount of distortion caused by the wide angle lens used to image chart 200, such that the final image output by the camera system (e.g. camera system 100) after calibration is corrected and thus undistorted. More specifically, the amount of distortion at each dot position is quantified by comparing FIG. 2 and FIG. 3, and then such amount of distortion is input into the camera system. Accordingly, the final output image generated by the camera system (e.g. camera system 100) is corrected for the distortion of each dot in order to eliminate distortion.

Figure 4:
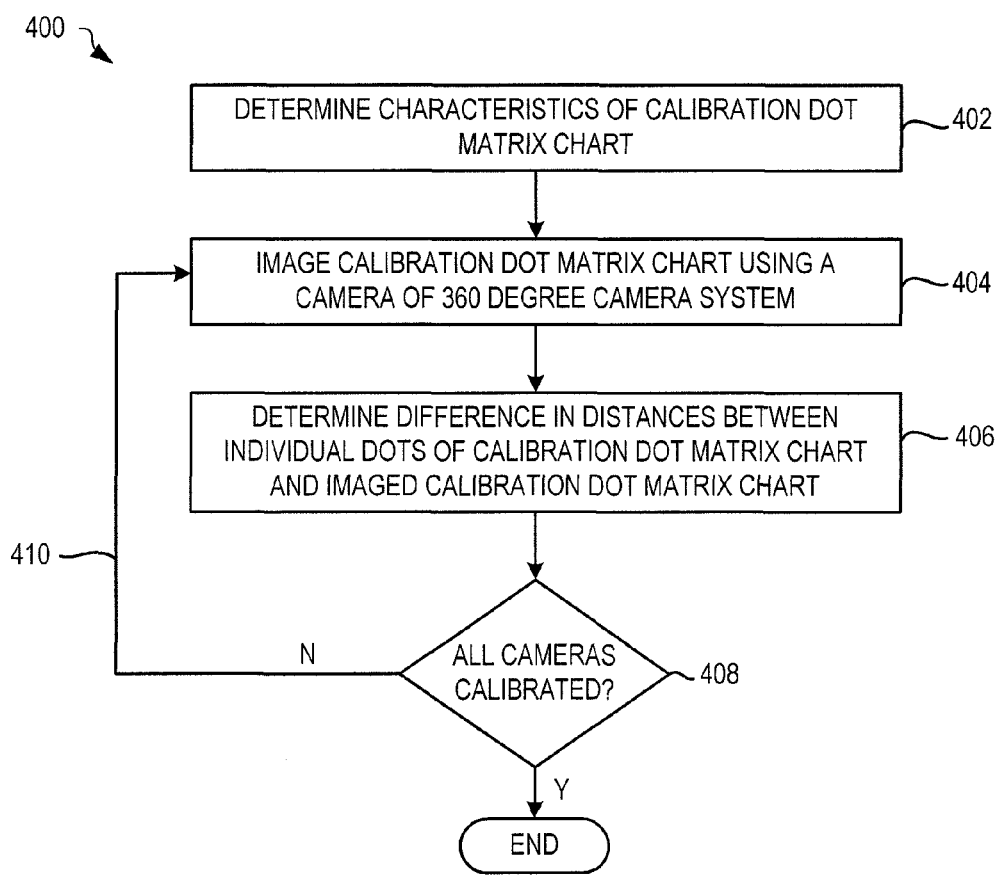
FIG. 4 depicts an exemplary flow chart of a method for performing a first calibration of a 360 degree camera system calibration, in one embodiment.

FIG. 4 depicts an exemplary flow chart of a method 400 for performing a first calibration of a 360 degree camera system calibration, in one embodiment. Method 400 is for example implemented within software 118 via execution by processor 120 and used to calibrate one or more cameras 102 of camera system 100, of FIG. 1.

In step 402, method 400 determines the characteristics of a calibration dot matrix chart. In one embodiment of step 402, the characteristics of calibration dot matrix chart 200 are determined.

In step 404, method 400 images the calibration dot matrix chart using a camera of the 360 degree camera system. In one embodiment of step 404, camera 102(1) images dot matrix chart 200.

In step 406, method 400 determines the difference in distances between individual dots of the calibration dot matrix chart of step 402 and the imaged calibration dot matrix chart imaged during step 404. In one example of step 406, method 400 determines the differences between the distances "D" between dots 302 of imaged scene 300, of FIG. 3, and the distances between dots 202 of dot matrix chart 200, of FIG. 2. In certain embodiments, step 406 may further include scaling the imaged dot matrix chart of step 404 such that a length and/or width of calibration dot matrix determined during step 402 is equal to a length and/or width of imaged calibration dot matrix imaged during step 404 (for example, length 204 and/or width 206 of dot matrix chart 200 is equal to length 304 and/or width 306 of chart 300, respectively).

Step 408 is a decision. If it is determined that all cameras within the camera system have been calibrated, method 400 ends and transmits the calibration setting to each respective camera. If it is determined that not all cameras within camera system have been calibrated, method 400 repeats steps 404 and 406 until all cameras are calibrated, as indicated by line 410.

Figure 5:
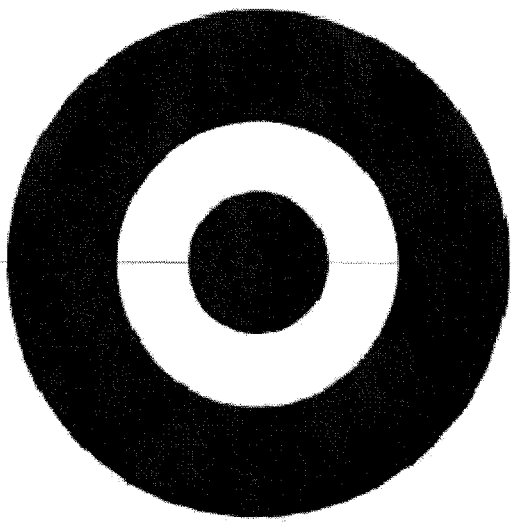
FIG. 5 depicts an exemplary bullseye component of a reference strip utilized to calibrate a camera of a 360 degree camera system.
Figure 5:
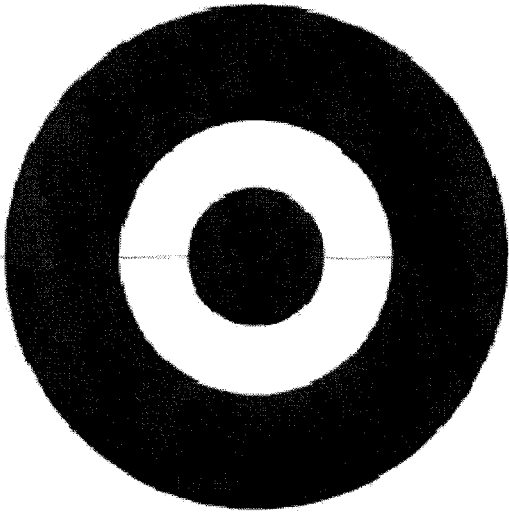
Figure 6:
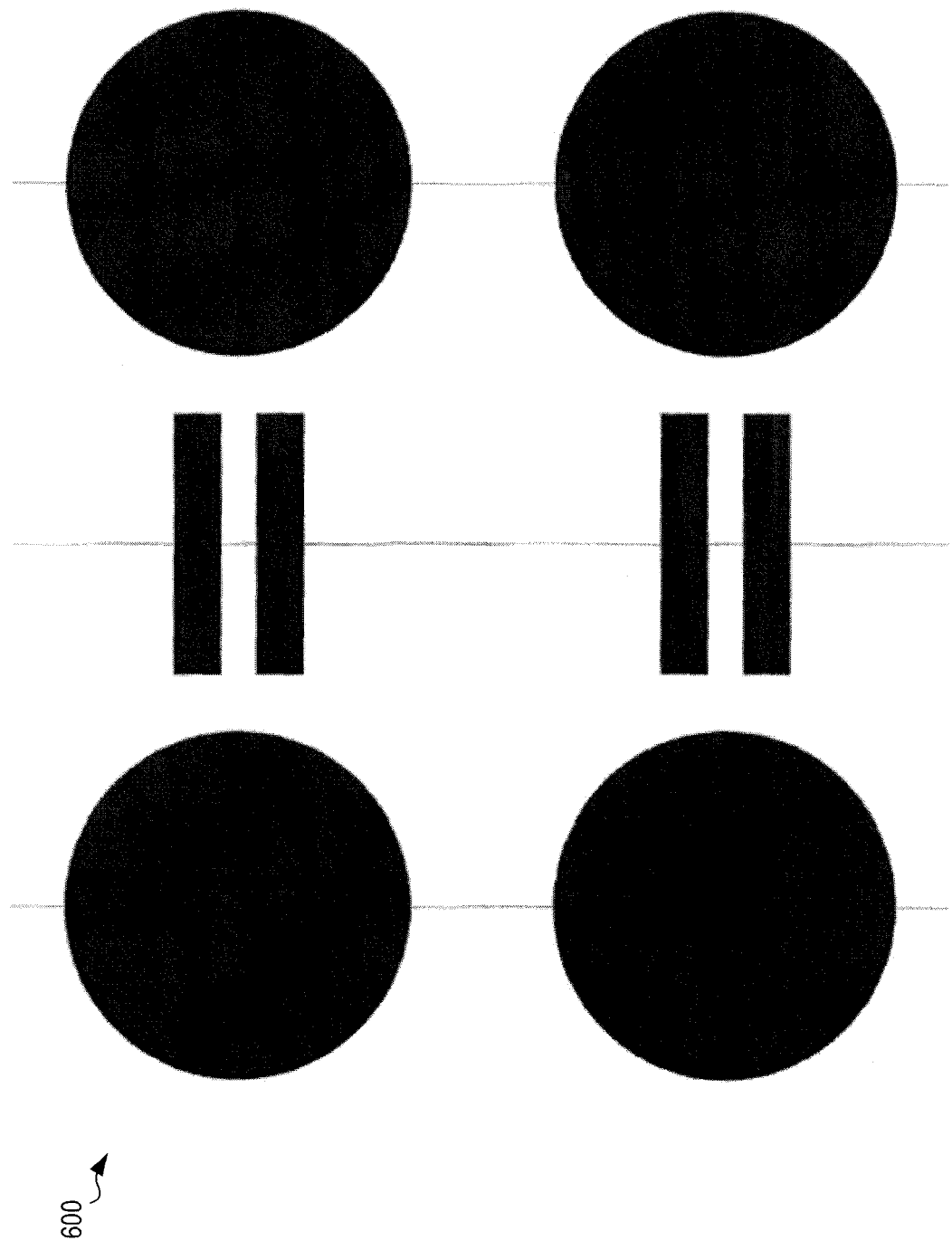
FIG. 6 depicts an exemplary dots component of a reference strip utilized to calibrate a camera of a 360 degree camera system.
Figure 7:
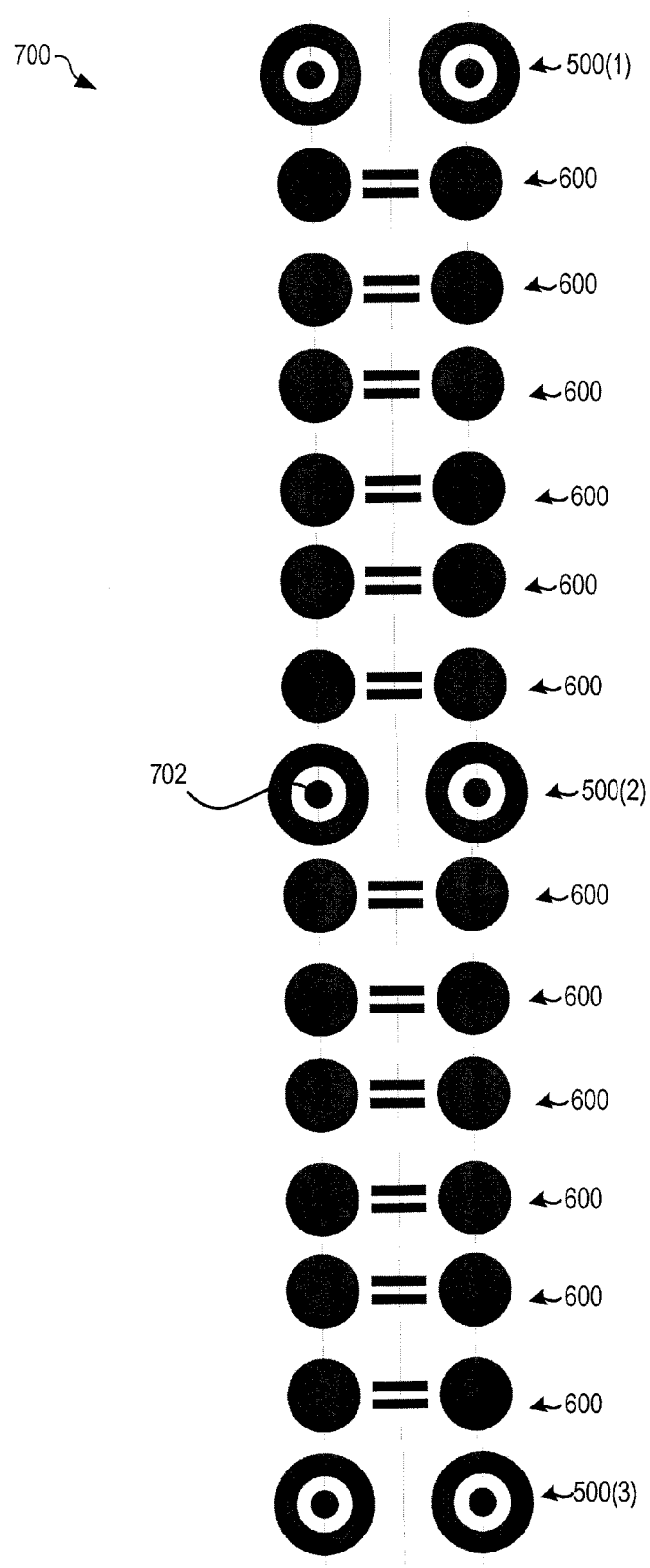
FIG. 7 depicts an exemplary reference strip 700 having bullseye components, of FIG. 5, and dots components, of FIG. 6 used to calibrate a camera of a 360 degree camera system, in one embodiment.
Figure 8:
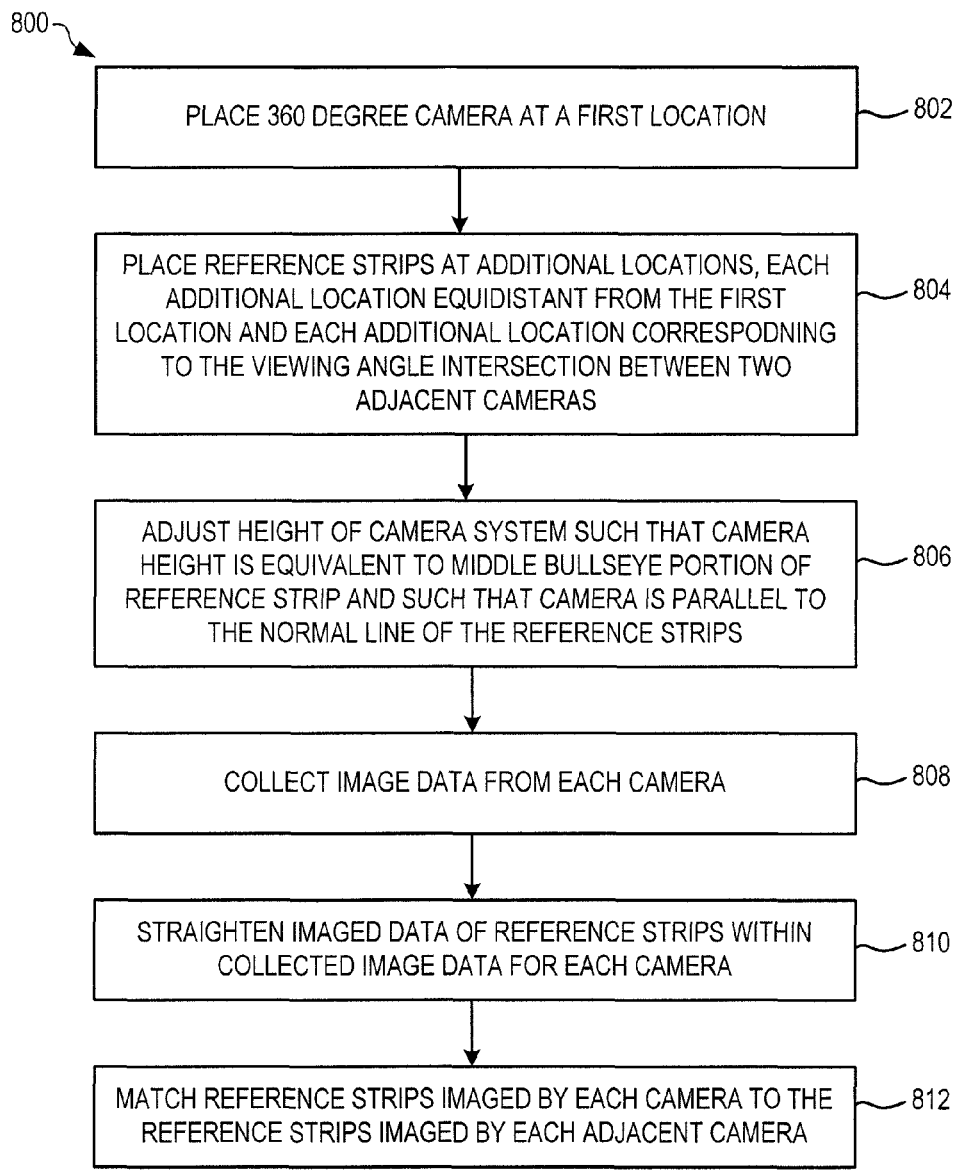
FIG. 8 depicts an exemplary method for calibrating a 360 degree camera system utilizing one or more reference strips, of FIG. 7, in one embodiment.
Figure 9:
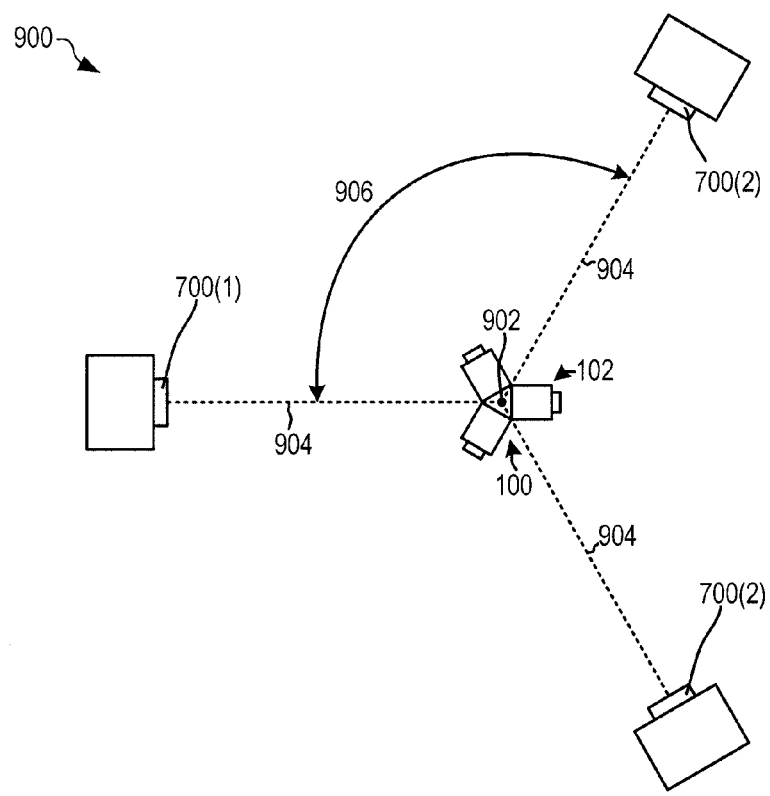
FIG. 9 depicts a top plan view of an exemplary configuration of a 360 degree camera system for implementing method, of FIG. 8, in one embodiment.

FIG. 5 depicts an exemplary bullseye component 500 of a reference strip utilized to calibrate a camera of a 360 degree camera system. FIG. 6 depicts an exemplary dots component 600 of a reference strip utilized to calibrate a camera of a 360 degree camera system. FIG. 7 depicts an exemplary reference strip 700 having bullseye components 500, of FIG. 5, and dots components 600, of FIG. 6 used to calibrate a camera of a 360 degree camera system, in one embodiment. FIG. 8 depicts an exemplary method 800 for calibrating a 360 degree camera system utilizing one or more reference strips 700, of FIG. 7, in one embodiment. FIG. 9 depicts a top plan view of an exemplary configuration of a 360 degree camera system for implementing method 800, of FIG. 8, in one embodiment. FIGS. 5-9 are bested viewed together with the following description.

Reference strip 700 is used to calibrate one or more of cameras 102 of system 100. During a second calibration method, performed using calibration system 110 for example, two reference strips 700 are utilized to calibrate each camera 102. Each reference strip includes one or more bullseye components 500 and one or more dots components 600. Dots component 600 includes two vertical rows of a plurality of dots, each row substantially parallel to the other row. Between each corresponding dots may include two bars. Referring now to FIG. 8, method 800, at step 802, method 800 places a 360 degree camera at a first location. For example, camera system 100, having three cameras 102 having a viewing angle of 130 degrees each (wherein the center of each viewing angle is 120 degrees apart from each adjacent camera 102), is placed at first location 902.

Figure 10:
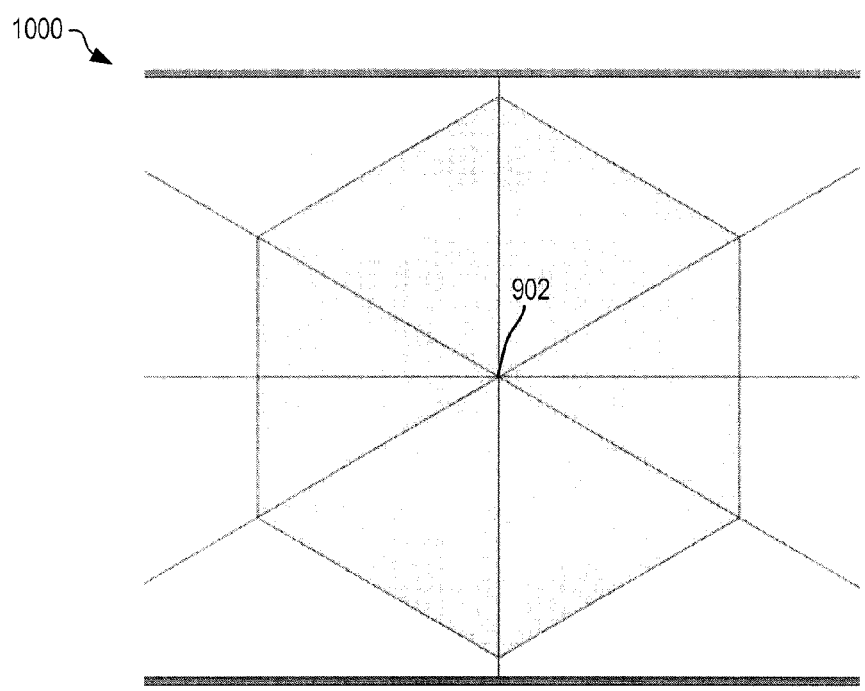
FIG. 10 depicts an exemplary laser print guide, in one embodiment.

At step 804, method 800 places each reference strip at additional locations and at a viewing angle intersection area between two cameras. For a three camera system (e.g. system 100), three reference strips are needed for this calibration. With reference to FIG. 9, three reference strips 700(1)-700(3) are placed 120 degrees apart (as indicated by angle line 906) at the intersection between each viewing angle of each camera 102. Moreover, each reference strip 700 is placed at an equal distance from first location 902. In one embodiment of step 804, each reference strip 700 is placed substantially perpendicular to the ground (i.e. substantially vertical), in a stationary location, and forms a planar surface (i.e. each strip 700 is substantially flat). Moreover, method 800 may utilize laser print guide 1000, of FIG. 10, to implement step 804, wherein the center of laser print guide 1000 is positioned at first location 902.

At step 806, method 800 adjusts the height of the camera system such that the camera height is equivalent to the height of the middle bullseye portion of each reference strip and such that the camera is parallel to the normal line of the reference strips. For example, camera system 100 is adjusted such that the height of the cameras 102 is equal to the center 702 of each respective bullseye portion 500(2). Moreover, camera system 100 is adjusted to be parallel to the normal line 904 of each reference strip 700.

Misalignment of cameras (e.g. cameras 102) may occur frequently when the cameras are set up on a level plane. The purpose of the calibration is to obtain the parameters of misalignment so that realignment may be later established in order to form an integrated camera system. Three important alignment parameters are pitch, roll and yaw. Two additional alignment parameters are shift and zoom. Each of these parameters is defined as follows.

Pitch refers to tilting of the reference strip either towards the viewer or away from the viewer. Roll refers to the rotation of the reference strip either clockwise or counterclockwise. Yaw refers to the turning of the reference strip either to the left or to the right. Shift refers to either the horizontal shifting of the reference strip leftward or rightward, or the vertical shifting of the reference strip upward or downward. Zoom refers to either the zooming in [towards the viewer] or the zooming out [away from the viewer] of the reference strip.

Figure 11:
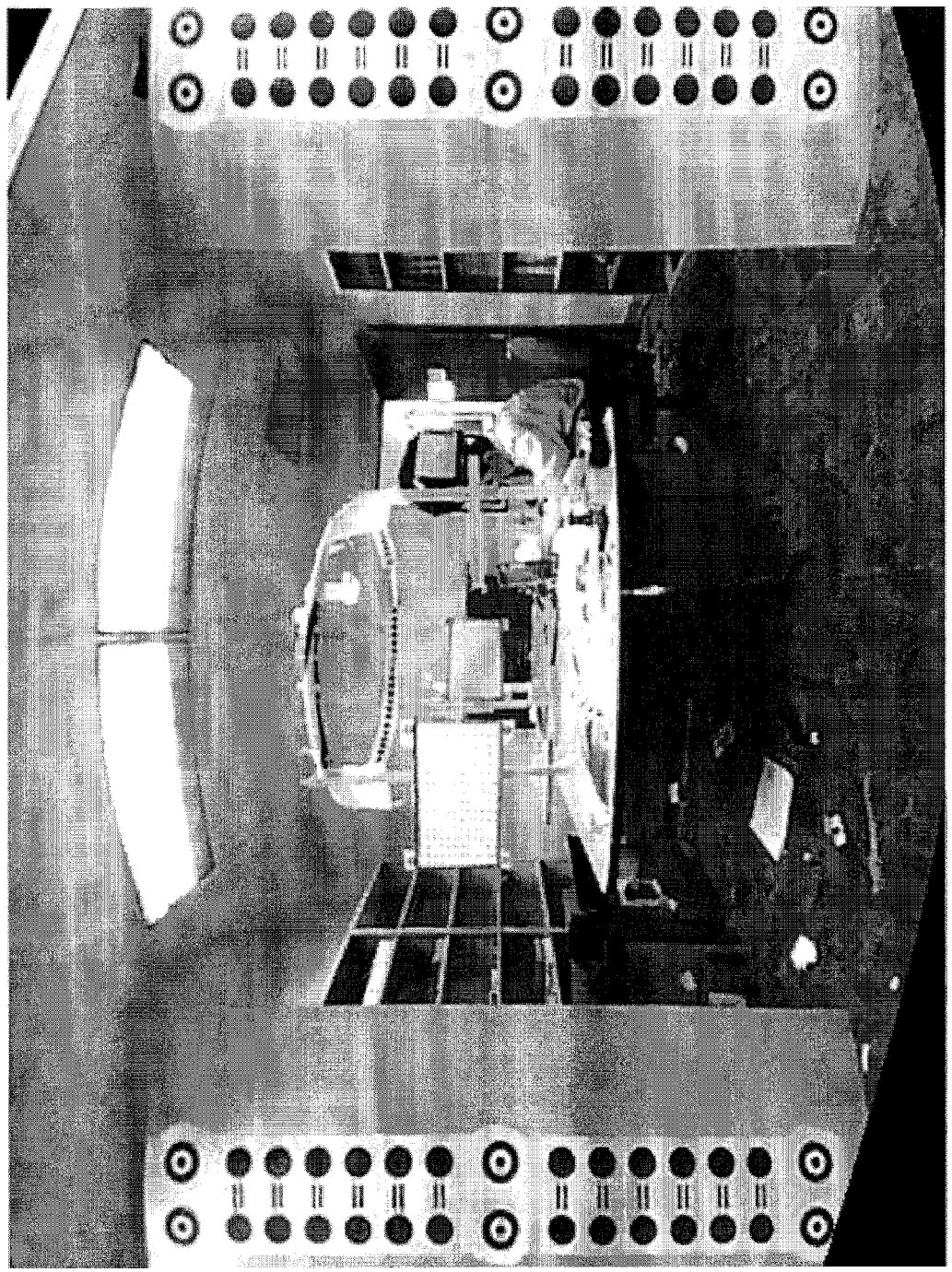
FIG. 11 depicts exemplary image data imaged by a camera within a 360 degree camera system having a left reference strip and a right reference strip, in one embodiment.

After configuring the physical set up of the calibration of camera system (i.e. steps 802-806), in step 808 image data is collected from each camera. For example, image data is collected from cameras 102 and input into image data 114. FIG. 11 depicts exemplary image data 1100 imaged by a camera within a 360 degree camera system having a left reference strip and a right reference strip, in one embodiment.

In step 810, method 800 straightens the data of each pair of reference strips associated with a first camera. In one embodiment of step 810, calibration software 118 analyzes image data 114 imaged by a first camera 102 to straighten imaged data of reference strips 700. More specifically, each pair of reference strips 700 imaged by camera 100 is corrected for their pitch, roll, and yaw. In essence, this digitally corrects each camera for its pitch, roll, and yaw. Step 810 is repeated for each camera within the 360 camera system.

In step 812, method 800 matches the reference strips imaged by each camera to the reference strips imaged by an adjacent camera within the camera system. In one embodiment of step 812, calibration software 118 analyzes image data 114 imaged by a first camera 102 and compares the image data to image data imaged by a second camera 102 to the left of the first camera. More specifically, the three reference strips 700 are corrected for shifting and zooming before they are matched. Further, since each camera images a left reference strip and a right reference strip, during the matching process of step 812, the left reference strip of a camera is matched to the right reference strip of its left neighboring camera, and the right reference strip of a camera is matched to the left reference strip of its right neighboring camera.

Figure 12:
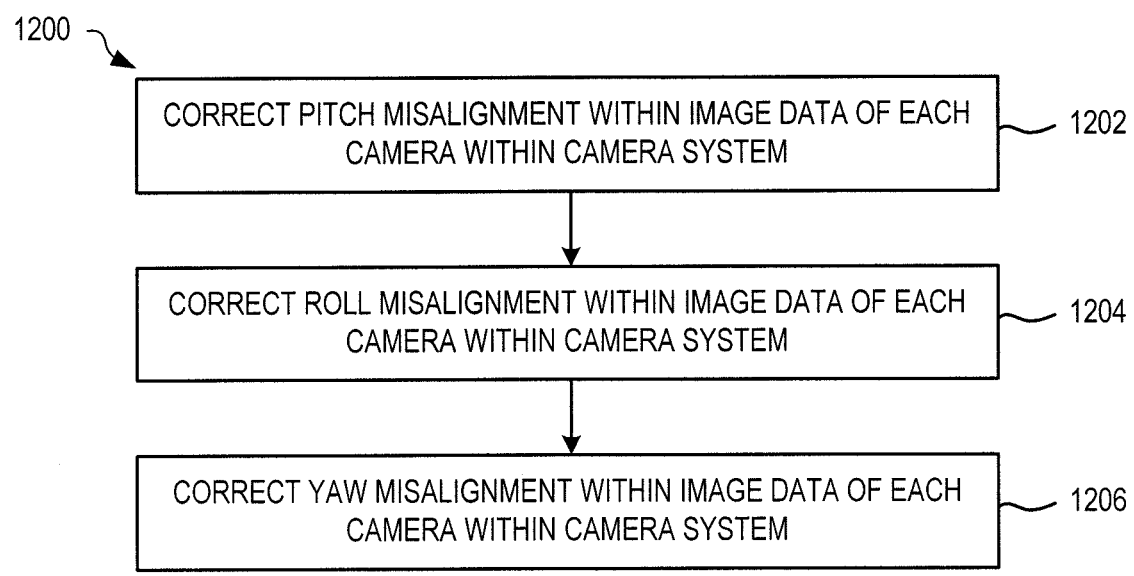
FIG. 12 depicts an exemplary method detailing straightening step of the method of FIG. 8 in more detail.

FIG. 12 depicts an exemplary method 1200 detailing straightening step 810 of method 800 of FIG. 8 in more detail.

Figure 13:
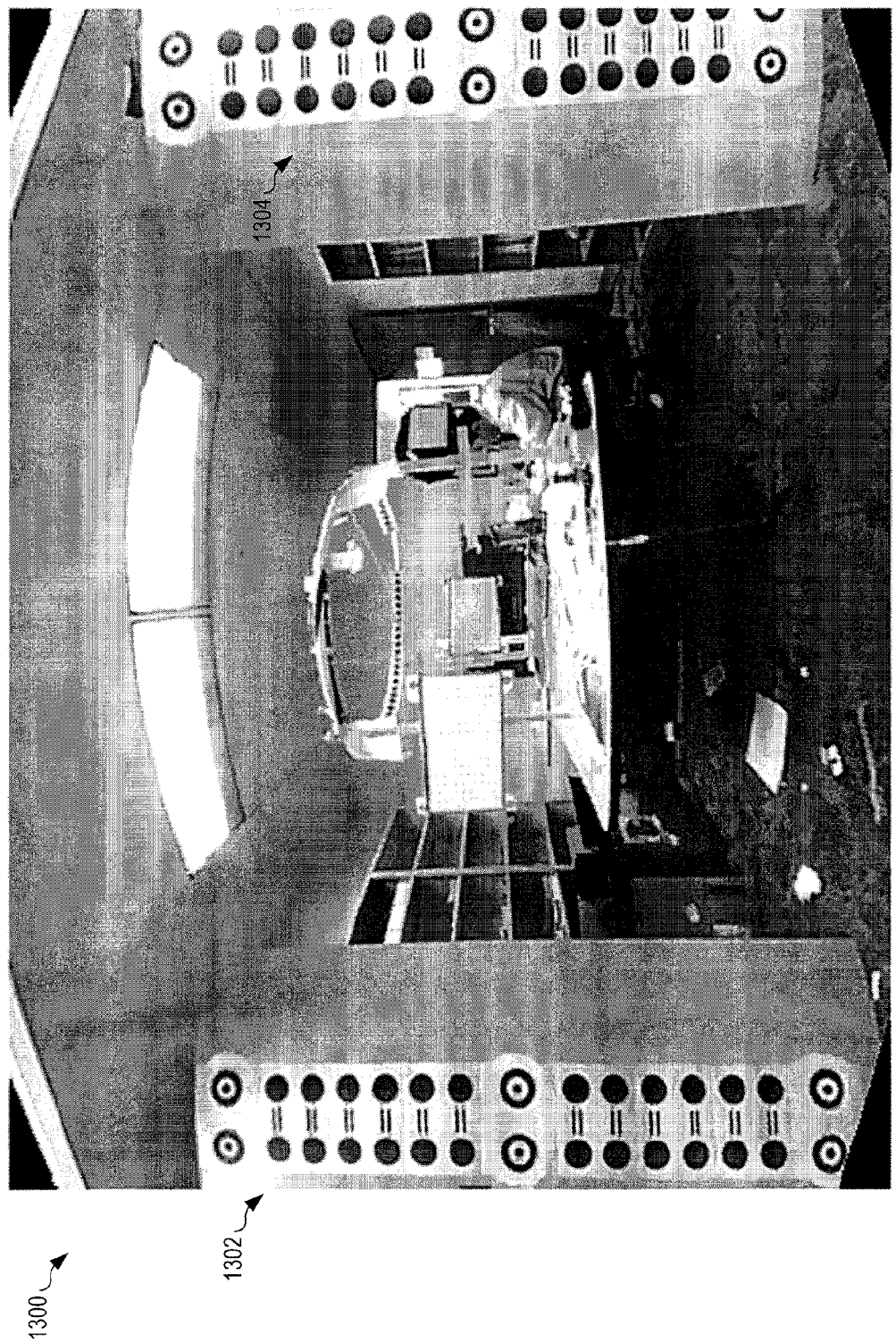
FIG. 13 depicts an imaged scene including a left reference strip and a right reference strip before pitch alignment.
Figure 14:
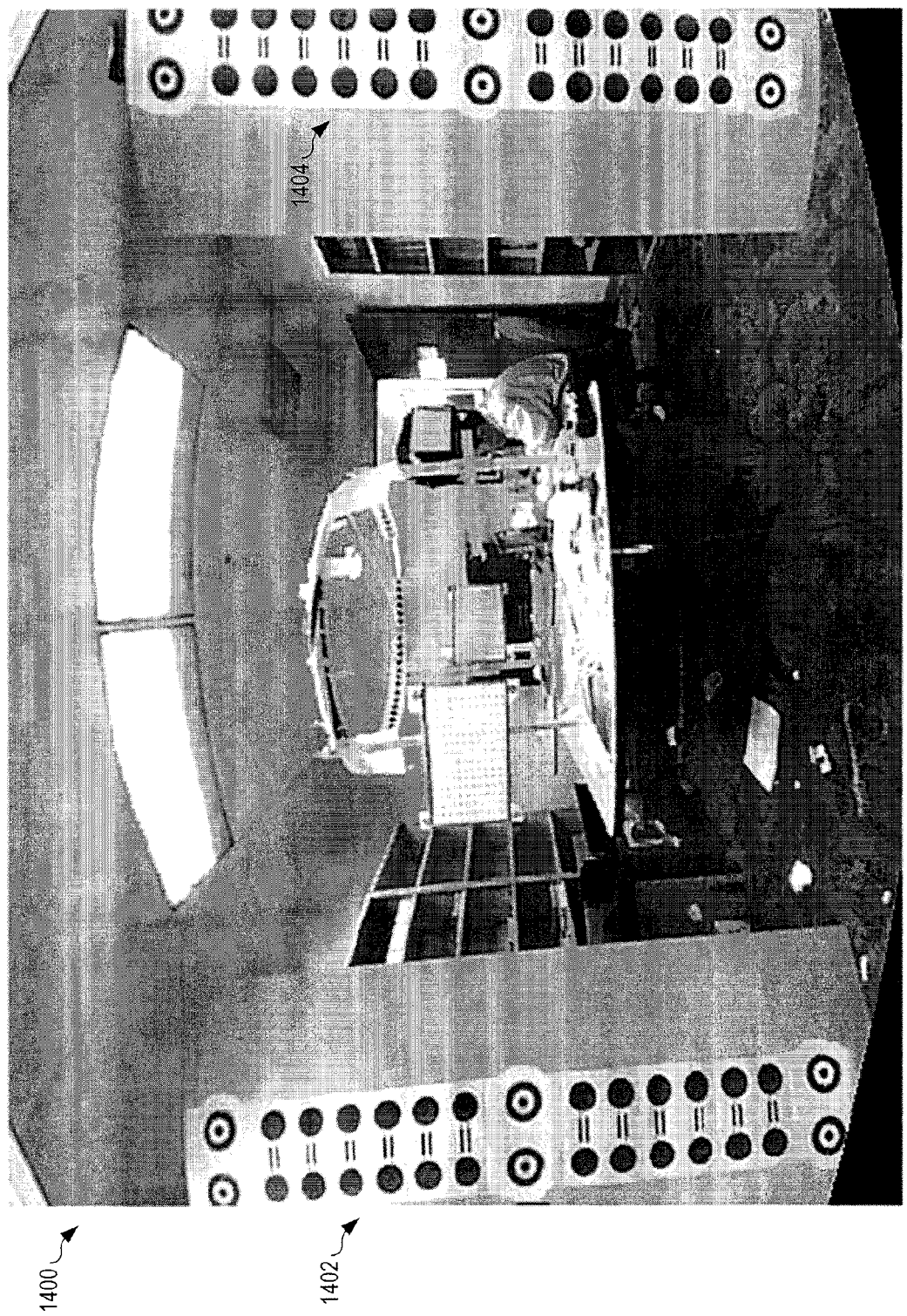
FIG. 14 depicts an imaged scene including left reference strip and a right reference strip after pitch alignment.

In step 1202, method 1200 corrects the pitch misalignment. For example, calibration software 118 analyses image data 114 to correct for pitch misalignment of each camera 102 within camera system 100. Step 1202 may include forcing the dotted lines of the left reference strip and the dotted lines of the right reference to be parallel. For example, FIG. 13 depicts an imaged scene 1300 including a left reference strip 1302 and a right reference strip 1304 before pitch alignment. FIG. 14 depicts an imaged scene 1400 including left reference strip 1402 and a right reference strip 1404 after pitch alignment. In FIG. 13, the dotted lines of the left reference strip 1302 and the dotted lines of the right reference strip 1304 are not parallel to each other. In fact, they converge towards each other at the top while diverging away from each other at the bottom. This caused by the top pitching away from the viewer and the bottom pitching towards the viewer. After digitally forcing the dotted lines to be parallel to each other, the pitching is corrected, as shown in FIG. 14. The amount of pitching correction is recorded, and is later used to physically correct for the actual pitching of the camera.

Figure 15:
FIG. 15 depicts an imaged scene including left reference strip and right reference strip before roll alignment correction.
Figure 16:
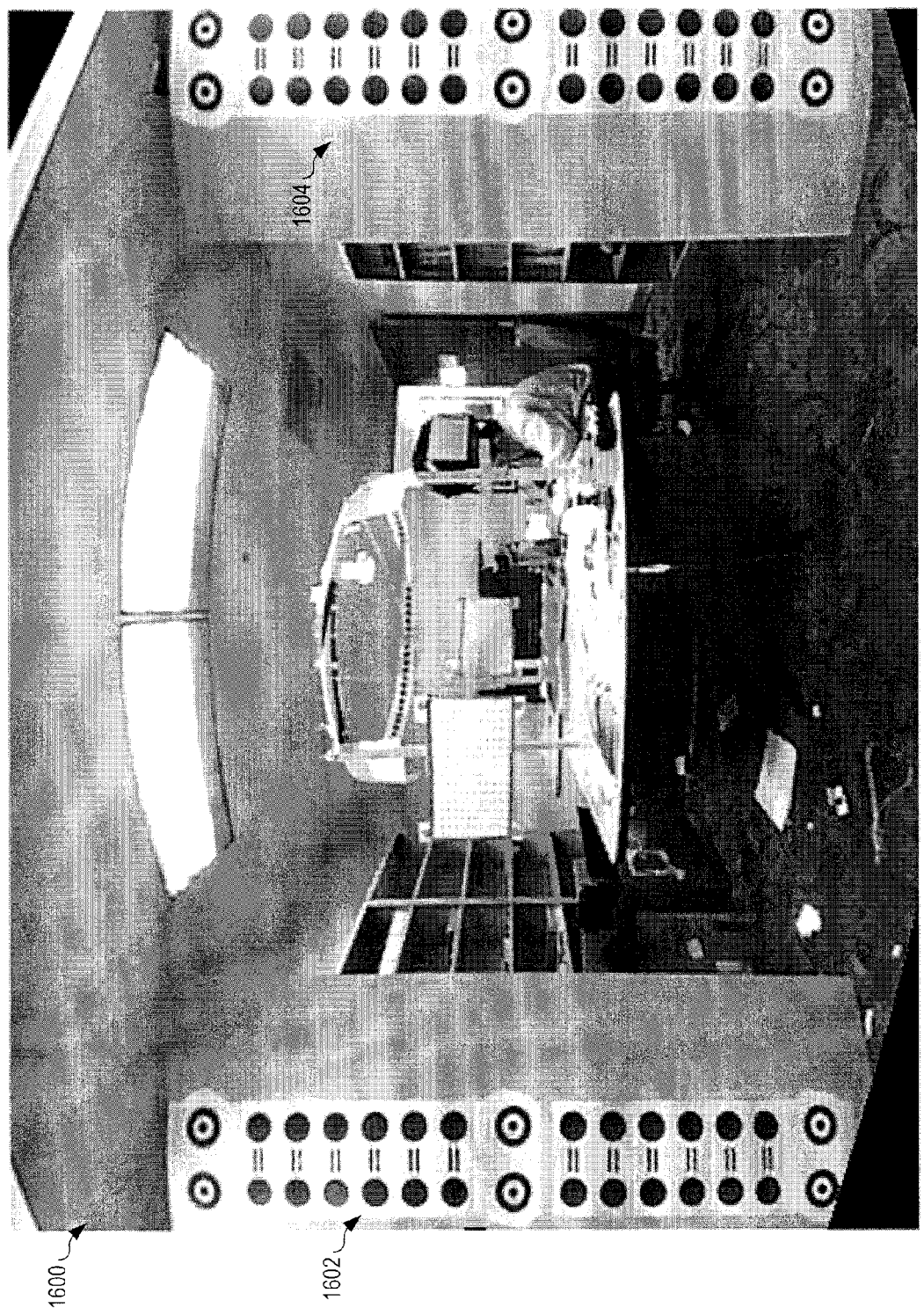
FIG. 16 depicts an imaged scene including left reference strip and right reference strip after roll alignment correction.

In step 1204, method 1200 corrects for roll misalignment. For example, calibration software 118 analyses image data 114 to correct for roll misalignment of each camera 102 within camera system 100. FIG. 15 depicts an imaged scene 1500 including left reference strip 1502 and right reference strip 1504 before roll alignment correction. FIG. 16 depicts an imaged scene 1600 including left reference strip 1602 and right reference strip 1604 after roll alignment correction. In FIG. 15, the dotted lines of each reference strip 1502, 1504 are not vertical. In fact, they appear to rotate counterclockwise. This caused by a counterclockwise roll. After digitally forcing the dotted lines to be vertical, the rolling is corrected, as shown in FIG. 16. The amount of rolling correction is recorded, and is later used to digitally correct for the actual rolling of the camera.

Figure 17:
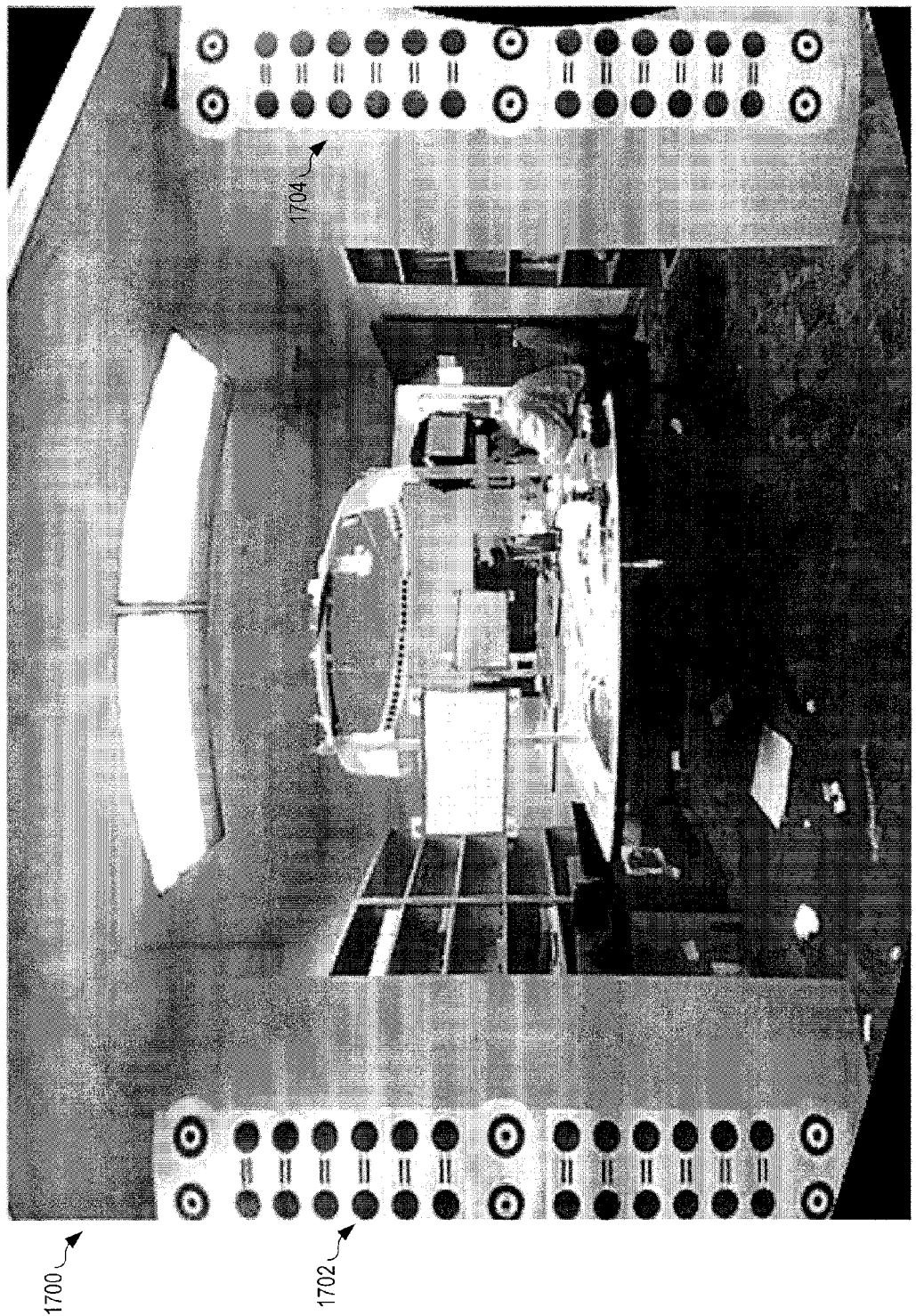
FIG. 17 depicts an imaged scene including left reference strip and right reference strip before yaw alignment correction.
Figure 18:
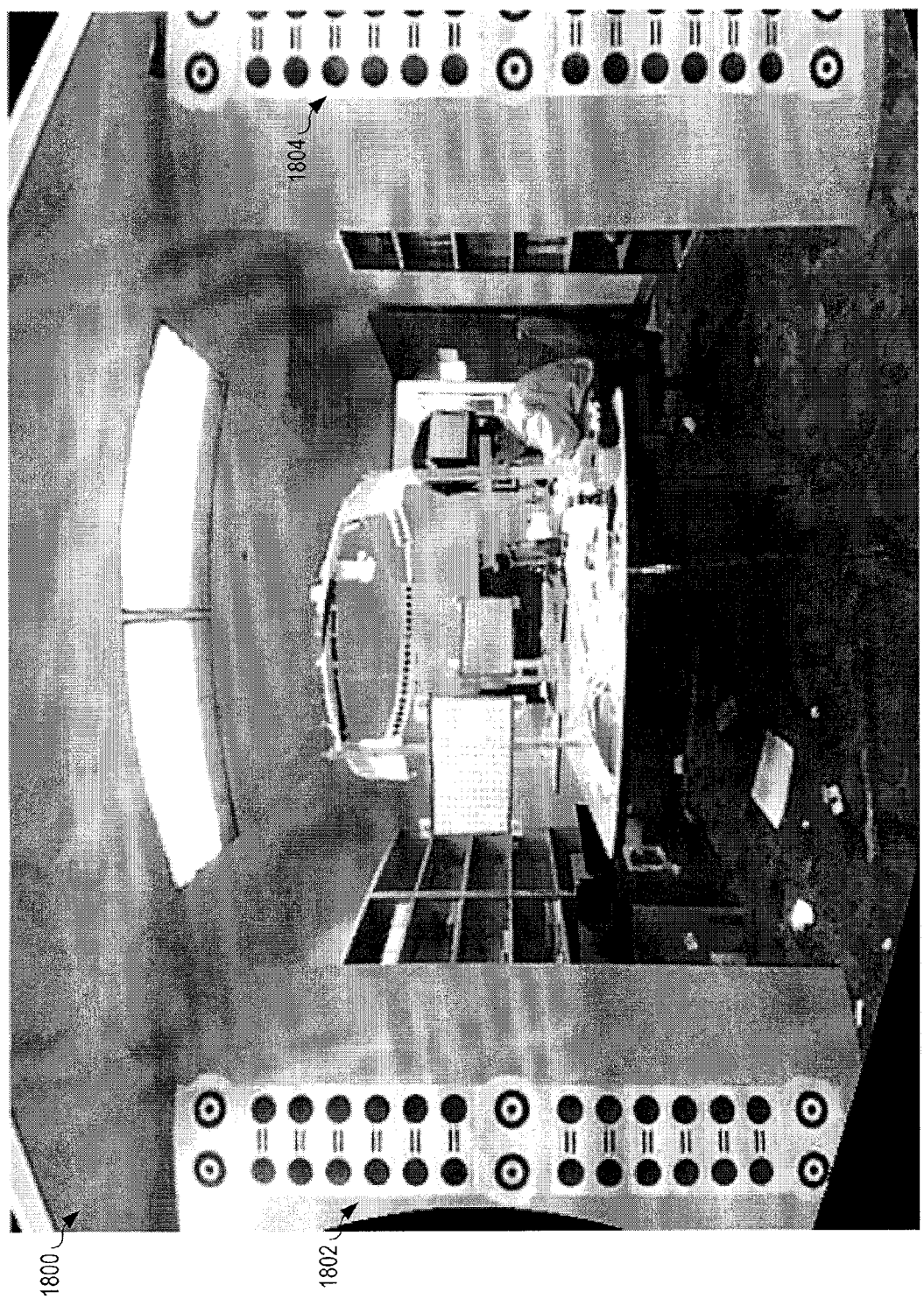
FIG. 18 depicts an imaged scene including left reference strip and right reference strip after yaw alignment correction.

In step 1206, method 1200 corrects for yaw misalignment. For example, calibration software 118 analyses image data 114 to correct for yaw misalignment of each camera 102 within camera system 100. This is done by forcing the pairs of dots in the left reference strip and the pairs of dots in the right reference strip to be at the same height. FIG. 17 depicts an imaged scene 1700 including left reference strip 1702 and right reference strip 1704 before yaw alignment correction. FIG. 18 depicts an imaged scene 1800 including left reference strip 1802 and right reference strip 1804 after yaw alignment correction. In FIG. 17, the pairs of dots in the left reference strip 1702 and the pairs of dots in the right reference 1704 strip are not at the same height. In fact, the pairs of dots in the left reference strip 1702 appear to be higher than the pairs of dots in the right reference strip 1704 at the top, while the pairs of dots in the left reference strip 1702 appear to be lower than the pairs of dots in the right reference strip 1704 at the bottom. This caused by the left reference strip 1702 yawing towards the viewer and the right reference strip 1704 yawing away from the viewer. After digitally forcing the pairs of dots of the two reference strips to be at the same height, the yawing is corrected, as shown in FIG. 18. The amount of yawing correction is recorded, and later is used to digitally correct for the actual yawing of each camera 102.

Figure 19:
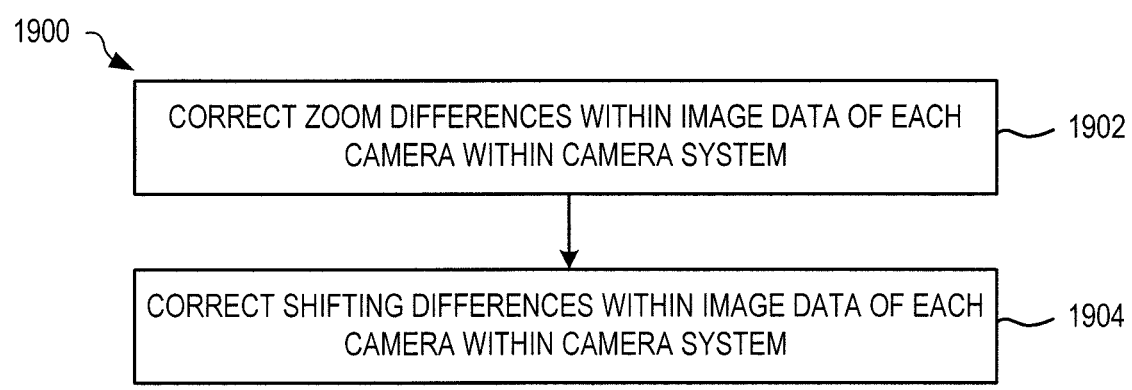
FIG. 19 depicts an exemplary method detailing reference strip matching step of the method of FIG. 8 in more detail.

FIG. 19 depicts an exemplary method 1900 detailing reference strip matching step 812 of method 800 of FIG. 8 in more detail.

Figure 20:
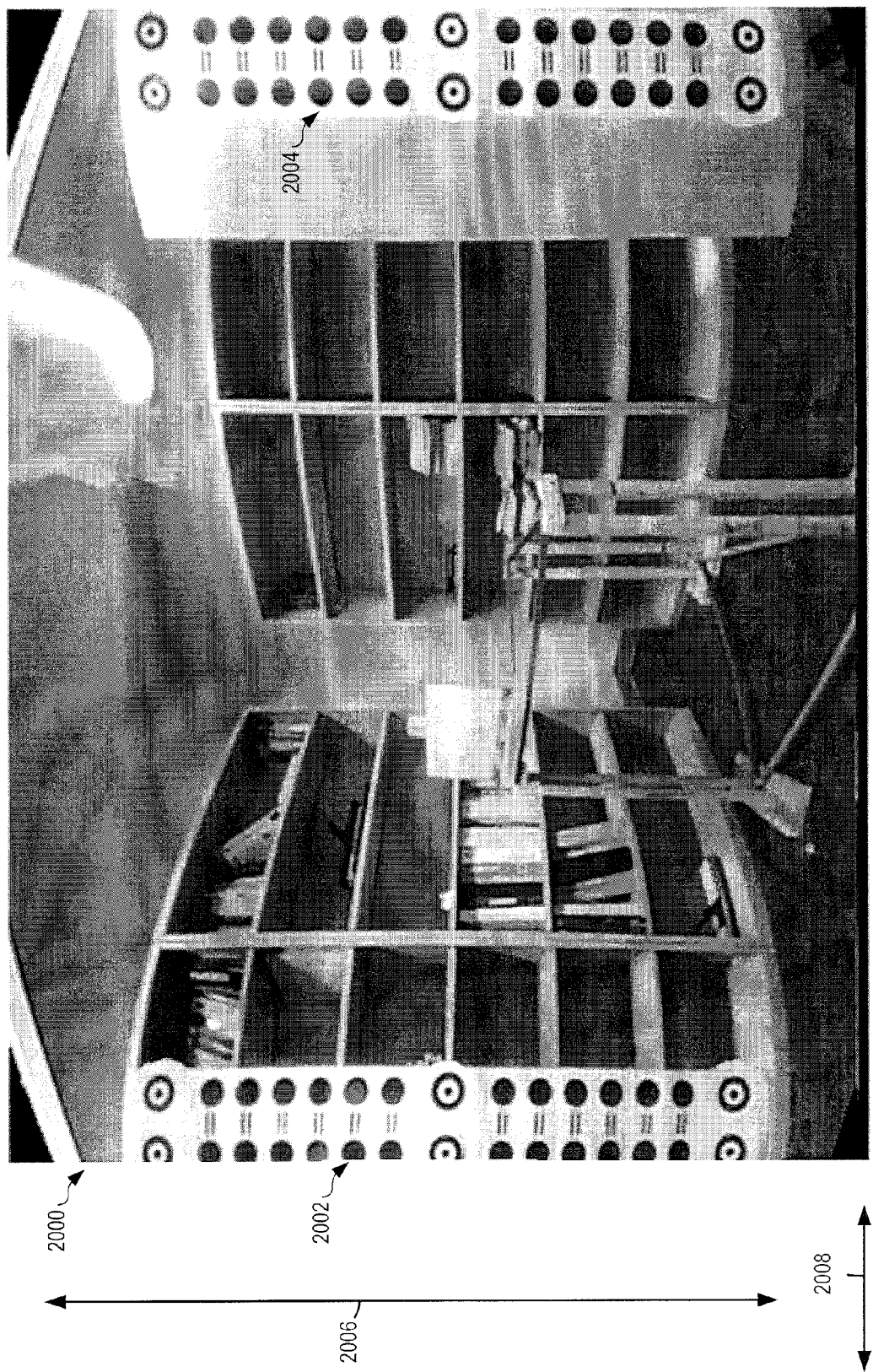
FIG. 20 depicts an imaged scene including left reference strip and right reference strip before zoom correction.
Figure 21:
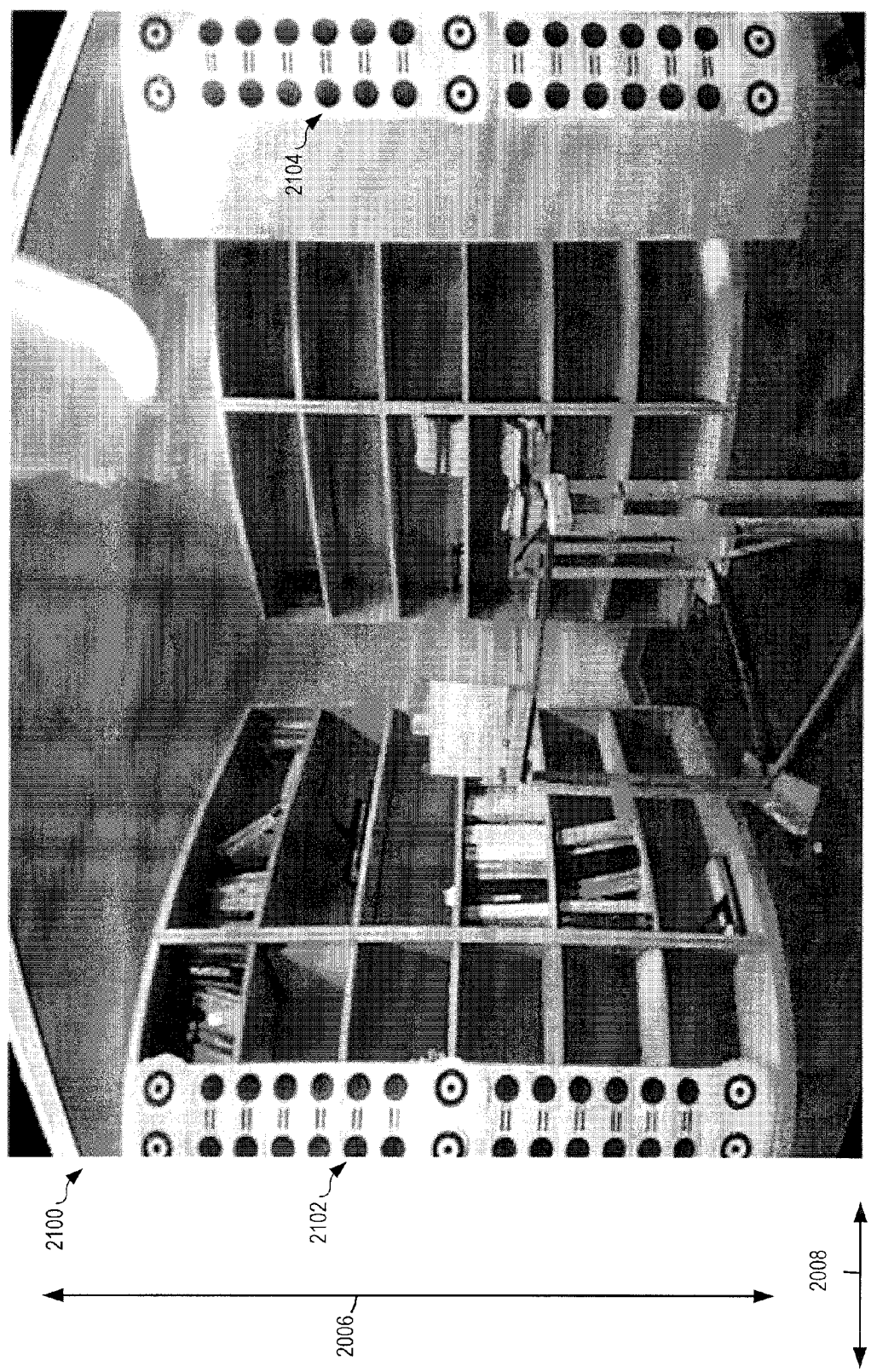
FIG. 21 depicts an imaged scene including left reference strip and right reference strip after zoom correction.

In step 1902, method 1900 corrects for differences in camera zooms between different ones of cameras within the camera system. For example, calibration software 118 analyzes image data 114 to correct for zoom differences within each camera 102 within camera system 100. This is done by proportionally expanding or shrinking the image of a particular camera, in the horizontal and/or vertical direction. FIG. 20 depicts an imaged scene 2000 including left reference strip 2002 and right reference strip 2004 before zoom correction. FIG. 21 depicts an imaged scene 2100 including left reference strip 2102 and right reference strip 2104 after zoom correction. The image in FIG. 20 is vertically contracted (along vertical direction 2006), and is therefore smaller in the vertical direction 2006 than the image in FIG. 21. Consequently, a zooming-in operation in the vertical direction 2006 is applied to the image in FIG. 20. The amount of zooming correction is recorded, and is later used to physically correct for the actual zooming of each camera. After the zooming correction of all three cameras, they will all finally have the same level of zooming, i.e., they will all produce images of the same size. Zoom correction may additionally occur in the horizontal direction 2008 without departing from the scope hereof.

In step 1904, method 1900 corrects for the shifting of each camera of the camera system in the horizontal and/or vertical direction. For example, calibration software 118 analyses image data 114 to correct for shifting within each camera 102 within camera system 100. The shifting is translational in nature. The amount of shifting is obtained by comparing the images that have been corrected thus far for all three cameras. It is later used to digitally correct for the physical shifting of each camera.

Method 800 is completed, for example utilizing methods 1200 and 1900 as discussed above, and the three cameras can now be integrated into a system by digitally superimposing the left reference strip of a camera on to the right reference strip of its left neighboring camera, and also by digitally superimposing the right reference strip of a camera on to the left reference strip of its right neighboring camera.

Although a preferred set of calibration steps have been disclosed as above, one should keep in mind that alternative orders and combinations of steps are also feasible. For example, one may opt to correct for rolling before pitching and yawing, or to correct for shifting before zooming, or to correct for zooming and shifting before pitching, rolling, and yawing.

Figure 22:
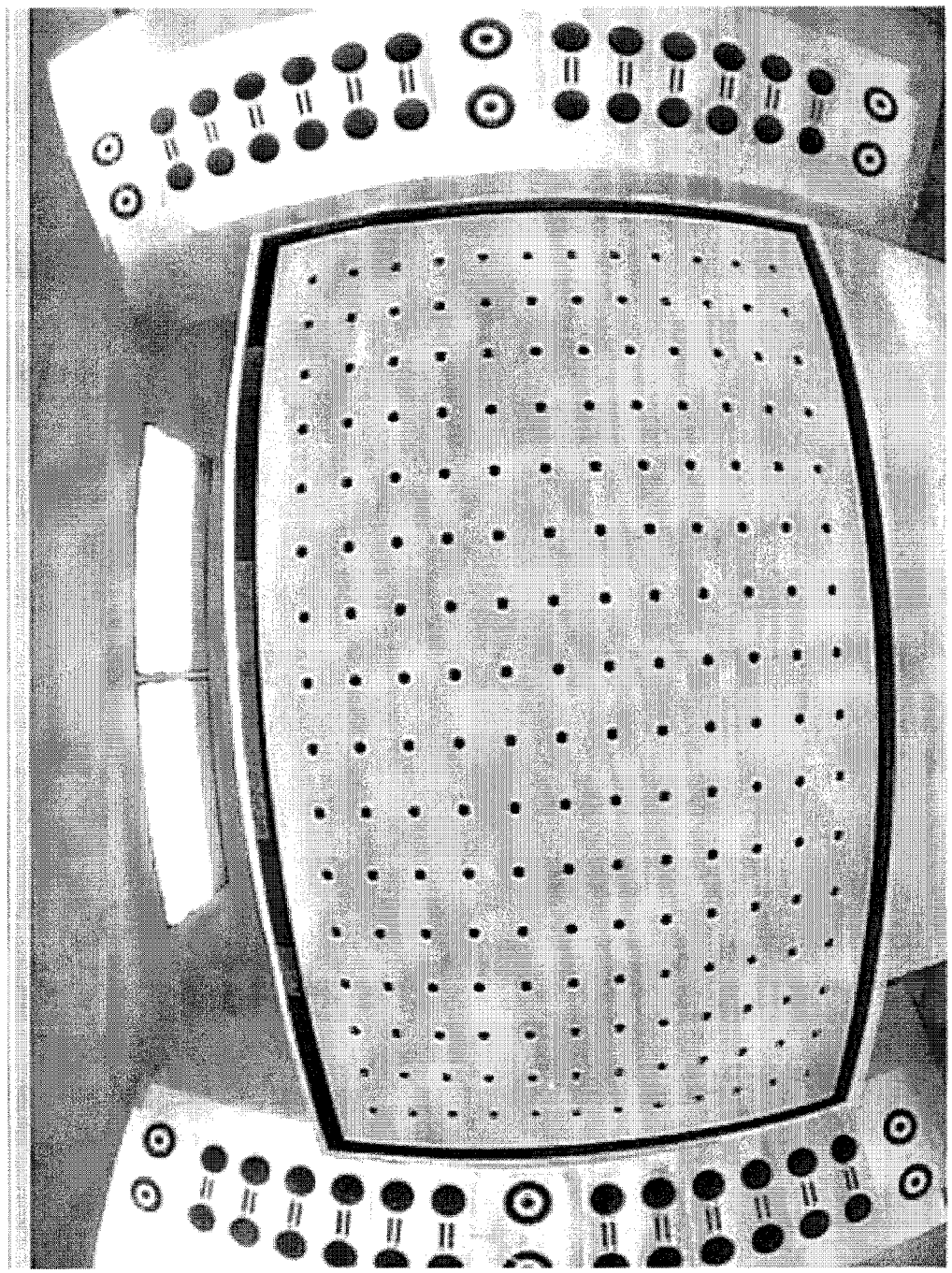
FIG. 22 depicts an exemplary imaged scene including calibration for the center camera, of the 360 degree camera system, of FIG. 1.
Figure 23:
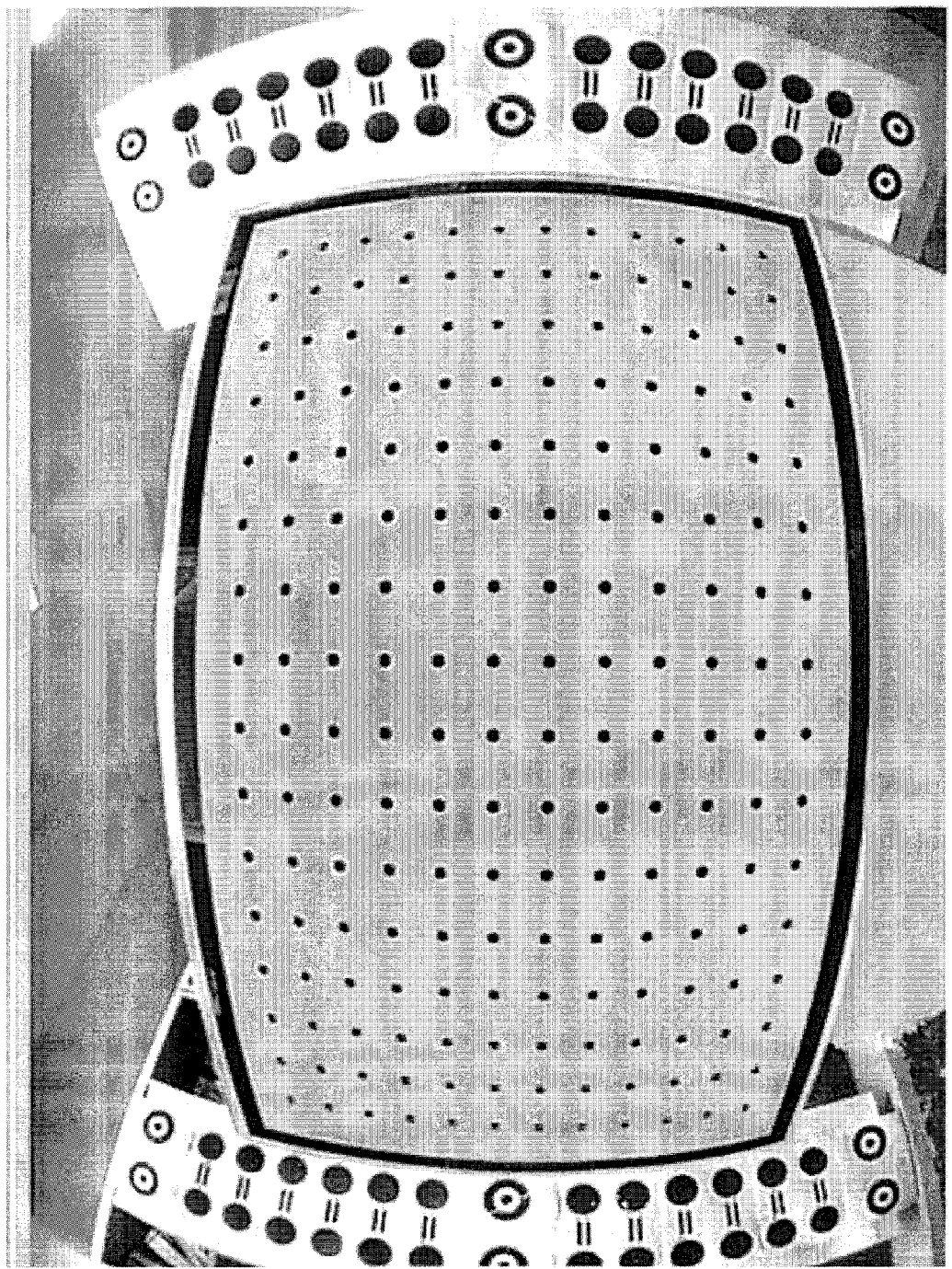
FIG. 23 depicts an exemplary imaged scene including calibration for the left camera, of the 360 degree camera system, of FIG. 1.
Figure 24:
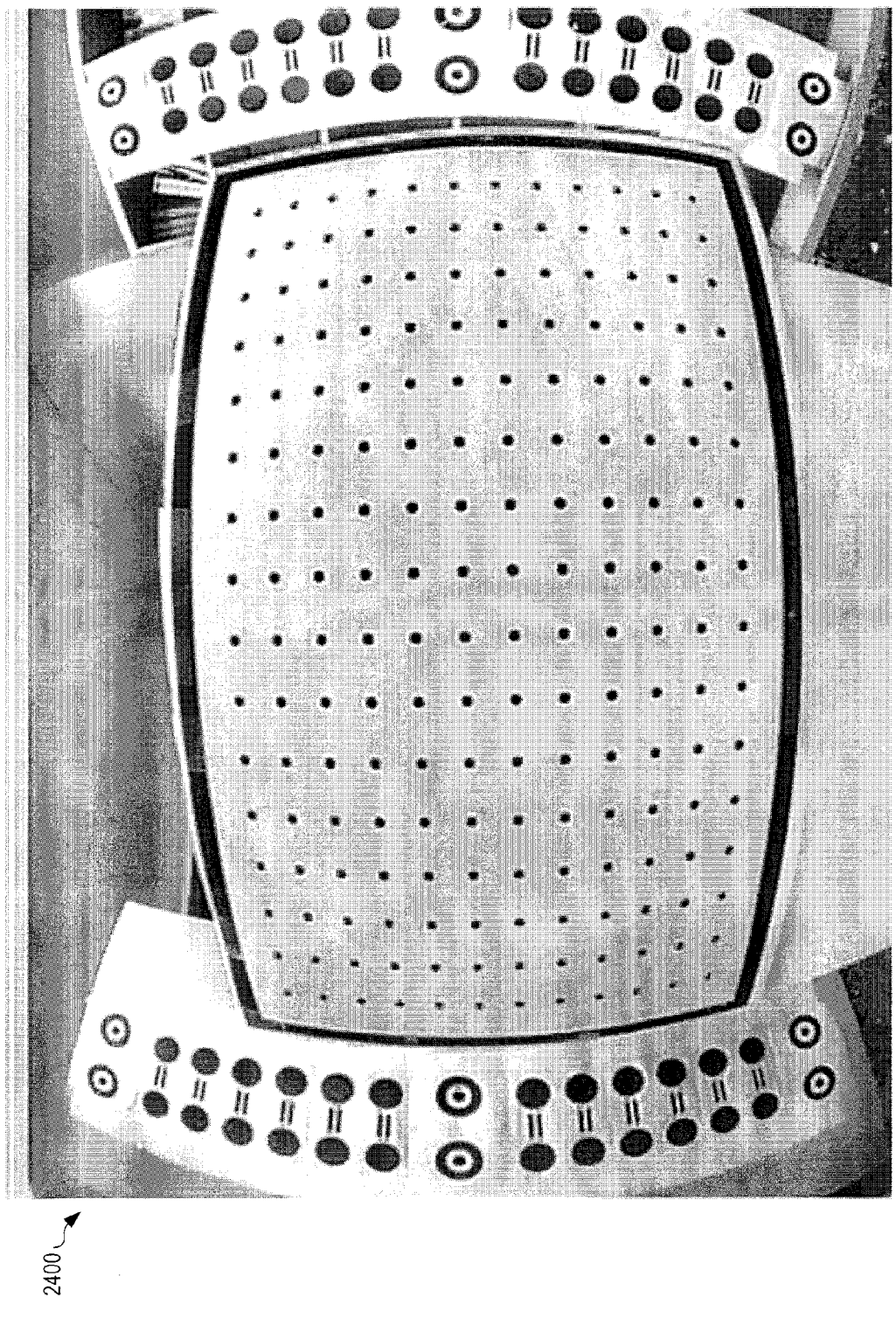
FIG. 24 depicts an exemplary imaged scene including calibration for the right camera, of the 360 degree camera system, of FIG. 1.

The above disclosed calibration method operates to correct for various types of distortion and misalignment that exist for each of the cameras within a 360 degree camera system. FIG. 22 depicts an exemplary imaged scene 2200 including calibration for the center camera 102(1), of the 360 degree camera system 100, of FIG. 1. FIG. 23, depicts an exemplary imaged scene 2300 including calibration for the left camera 102(2), of the 360 degree camera system 100, of FIG. 1. FIG. 24 depicts an exemplary imaged scene 2400 including calibration for the right camera 102(3), of the 360 degree camera system 100, of FIG. 1. After applying the calibration methods as disclosed above, all distortion and misalignment will be substantially reduced or removed, and the three cameras can be integrated into a system to produce a smooth panoramic view.

Combination of Features:

Various features of the present disclosure have been described above in detail. The disclosure covers any and all combinations of any number of the features described herein, unless the description specifically excludes a combination of features. The following examples illustrate some of the combinations of features contemplated and disclosed herein in accordance with this disclosure.

(A1) In a method for calibrating a 360 degree camera system having a plurality of cameras, the method includes: placing the 360 degree camera system at a first location; placing reference strips at respective additional locations, each additional location equidistant from the first location and each additional location corresponding to a viewing angle intersection between two adjacent cameras of the 360 degree camera system; adjusting the height of the 360 degree camera system such that the camera height is equal to the middle of the reference strips; capturing imaged data of two of the reference strips using each of the cameras; straightening imaged reference strips within the image data captured by a first camera of the plurality of cameras; and, matching the imaged reference strips imaged by the first camera to the image reference strips captured by each camera adjacent to the first camera.

(A2) In the method denoted above as (A1), wherein each reference strip includes a bullseye component and a dots component, each dots component including two rows of dots, each row substantially vertical and parallel to the other row.

(A3) In the method denoted above as (A2), wherein between corresponding dots of each row of dots is two bars.

(A4) In any of the methods denoted above as (A1)-(A3), wherein the step of placing reference strips includes placing each reference strip in a respective stationary location, such that the reference strip is substantially vertical and is substantially flat.

(A5) In any of the methods denoted above as (A1)-(A4), wherein the step of placing reference strips includes using a laser print guide to verify the angle between each reference strip.

(A6) In any of the methods denoted above as (A2)-(A5), wherein the step of adjusting includes adjusting the height of the 360 degree camera system such that the camera height is equivalent to the center of a middle one of the bullseye components of the reference strips.

(A7) In any of the methods denoted above as (A2)-(A6), wherein the step of straightening includes: correcting for pitch misalignment within the imaged data captured by the first camera; correcting for roll misalignment within the imaged data captured by the first camera; and, correcting for yaw misalignment within the imaged data captured by the first camera.

(A8) In the method denoted above as (A7), wherein the step of correcting for pitch misalignment includes digitally forcing each row of dots components to be substantially parallel within the imaged data.

(A9) In any of the methods denoted above as (A7)-(A8), wherein the step of correcting for roll misalignment includes digitally forcing each row of dots to be substantially vertical within the imaged data.

(A10) In any of the methods denoted above as (A7)-(A9), wherein the step of correcting for yaw misalignment includes digitally forcing two of the reference strips to the same height within the imaged data.

(A11) In any of the methods denoted above as (A2)-(A10), wherein the step of matching includes: correcting for zoom misalignment within the imaged data captured by each of the cameras; and, correcting for shift misalignment within the imaged data captured by each of the cameras.

(A12) In the method denoted above as (A11), wherein the step of correcting for zoom misalignment includes expanding and/or shrinking the imaged data of a first camera to match the image data of an adjacent camera.

(A13) In any of the methods denoted above as (A11)-(A12), wherein the step of correcting for shift misalignment includes translating the image data of a first camera to align with image data of an adjacent camera.

(A14) In any of the methods denoted above as (A1)-(A13), further including outputting a calibration setting based upon the steps of straightening and matching to the 360 degree camera system to calibrate the camera system.

(B1) A system for calibrating a 360 degree camera system having a plurality of cameras, the system including: a non-transitory memory including a database for storing image data captured by each of the plurality of cameras, the image data including imaged reference strips; a processor; a plurality of reference strips; and, calibration software stored within the memory as computer readable instructions executable by the processor, the calibration software configured to: analyze the image data to straighten the imaged reference strips within the imaged data captured by each of the plurality of cameras, and analyze the image data to match the imaged reference strips imaged by a first camera of the plurality of cameras to the imaged reference strips imaged by another of the plurality of cameras adjacent to the first camera.

(B2) In the system denoted above as (B1), wherein the calibration software is further configured to: correct for pitch misalignment within the imaged data captured by the first camera; correct for roll misalignment within the imaged data captured by the first camera; and, correct for yaw misalignment within the imaged data captured by the first camera.

(B3) In the method denoted above as (B2), wherein to correct for pitch misalignment, the calibration software digitally forces each row of dots components to be substantially parallel within the imaged data.

(B4) In any of the methods denoted above as (B2)-(B3), wherein to correct for roll misalignment, the calibration software digitally forces each row of dots to be substantially vertical within the imaged data.

(B5) In any of the methods denoted above as (B2)-(B4), wherein in order to correct for yaw misalignment, the calibration software digitally forces two of the reference strips to the same height within the imaged data.

(B6) In any of the systems denoted above as (B1)-(B5), wherein in order to match the imaged reference strips, the calibration software is further configured to: correct for zoom misalignment within the imaged data captured by each of the cameras; and, correct for shift misalignment within the imaged data captured by each of the cameras.

(B7) In the method denoted above as (B6), wherein in order to correct for zoom misalignment, the calibration software expands and/or shrinks the imaged data of a first camera to match the image data of an adjacent camera.

(B8) In any of the methods denoted above as (B6)-(B7), wherein in order to correct for shift misalignment, the calibration software translates the image data of a first camera to align with image data of an adjacent camera.

(B9) In any of the systems denoted above as (B1)-(B8), wherein a height of the cameras of the 360 degree camera system is equivalent to a middle of the reference strips.

(B10) In any of the systems denoted above as (B1)-(B9), wherein each reference strip includes a bullseye component and a dots component, each dots component including two rows of dots, each row substantially vertical and parallel to the other row.

(B11) In any of the systems denoted above as (B1)-(B10), wherein the 360 degree camera system is located at a first location and each of the reference strips are respectively located at an additional location, each additional location being equidistant from the first location and corresponding to a viewing angle intersection between two adjacent cameras of the 360 degree camera system.

(B12) In any of the systems denoted above as (B1)-(B11), wherein the calibration software is further configured to output a calibration setting to the 360 degree camera system based on the analysis of the image data to straighten and match the imaged reference strips.

(B13) In any of the systems denoted above as (B1)-(B12), wherein the plurality of cameras of the 360 degree camera system have equivalent fields of view.

(B14) In any of the systems denoted above as (B1)-(B12), wherein the plurality of cameras of the 360 degree camera system have non-equivalent fields of view.

The above disclosed invention relates to a multitude of cameras that have their viewing angles pointing outward horizontally. The same invention may also be applied to a multitude of cameras that have their viewing angles pointing either upward to downward. For example, there may be three cameras installed in a ceiling, with each camera slanted to point downward and away from each other. Such a camera system resembles a fisheye surveillance system, with the exception that the latter consists of only one camera whereas the former includes three cameras. The calibration method of such a downward pointing system of cameras is substantially the same as the invention disclosed herein.

We claim:

1. A method of calibrating a 360 degree camera system having a plurality of cameras, comprising:
   placing the 360 degree camera system at a first location;
   placing reference strips at respective additional locations, each additional location equidistant from the first location and each additional location corresponding to a viewing angle intersection between two adjacent cameras of the 360 degree camera system;
   adjusting the height of the 360 degree camera system such that the camera height is equal to the middle of the reference strips;
   capturing imaged data of two of the reference strips using each of the cameras;
   straightening imaged reference strips within the image data captured by a first camera of the plurality of cameras; and,
   matching the imaged reference strips imaged by the first camera to the image reference strips captured by each camera adjacent to the first camera.

2. The method of claim 1, wherein each reference strip includes a bullseye component and a dots component, each dots component including two rows of dots, each row substantially vertical and parallel to the other row.

3. The method of claim 2, wherein between corresponding dots of each row of dots is two bars.

4. The method of claim 1, wherein the step of placing reference strips includes placing each reference strip in a respective stationary location, such that the reference strip is substantially vertical and is substantially flat.

5. The method of claim 1, wherein the step of placing reference strips includes using a laser print guide to verify the angle between each reference strip.

6. The method of claim 2, wherein the step of adjusting includes adjusting the height of the 360 degree camera system such that the camera height is equivalent to the center of a middle one of the bullseye components of the reference strips.

7. The method of claim 2, wherein the step of straightening includes:
   correcting for pitch misalignment within the imaged data captured by the first camera;
   correcting for roll misalignment within the imaged data captured by the first camera; and,
   correcting for yaw misalignment within the imaged data captured by the first camera.

8. The method of claim 7, wherein the step of correcting for pitch misalignment includes digitally forcing each row of dots components to be substantially parallel within the imaged data.

9. The method of claim 7, wherein the step of correcting for roll misalignment includes digitally forcing each row of dots to be substantially vertical within the imaged data.

10. The method of claim 7, wherein the step of correcting for yaw misalignment includes digitally forcing two of the reference strips to the same height within the imaged data.

11. The method of claim 2, wherein the step of matching includes:
   correcting for zoom misalignment within the imaged data captured by each of the cameras; and,
   correcting for shift misalignment within the imaged data captured by each of the cameras.

12. The method of claim 11, wherein the step of correcting for zoom misalignment includes expanding and/or shrinking the imaged data of a first camera to match the image data of an adjacent camera.

13. The method of claim 11, wherein the step of correcting for shift misalignment includes translating the image data of a first camera to align with image data of an adjacent camera.

14. The method of claim 1, further comprising outputting a calibration setting based upon the steps of straightening and matching to the 360 degree camera system to calibrate the camera system.

15. A system for calibrating a 360 degree camera system having a plurality of cameras, the system including:
   a non-transitory memory including a database for storing image data captured by each of the plurality of cameras, the image data including imaged reference strips;
   a processor;
   a plurality of reference strips; and,
   calibration software stored within the memory as computer readable instructions executable by the processor, the calibration software configured to:
      analyze the image data to straighten the imaged reference strips within the imaged data captured by each of the plurality of cameras, and
      analyze the image data to match the imaged reference strips imaged by a first camera of the plurality of cameras to the imaged reference strips imaged by another of the plurality of cameras adjacent to the first camera.

16. The system of claim 15, wherein the calibration software is further configured to:
   correct for pitch misalignment within the imaged data captured by the first camera;
   correct for roll misalignment within the imaged data captured by the first camera; and,
   correct for yaw misalignment within the imaged data captured by the first camera.

17. The system of claim 15, wherein in order to match the imaged reference strips, the calibration software is further configured to:
   correct for zoom misalignment within the imaged data captured by each of the cameras; and,
   correct for shift misalignment within the imaged data captured by each of the cameras.

18. The system of claim 15, wherein a height of the cameras of the 360 degree camera system is equivalent to a middle of the reference strips.

19. The system of claim 15, wherein each reference strip includes a bullseye component and a dots component, each dots component including two rows of dots, each row substantially vertical and parallel to the other row.

20. The system of claim 15, wherein the 360 degree camera system is located at a first location and each of the reference strips are respectively located at an additional location, each additional location being equidistant from the first location and corresponding to a viewing angle intersection between two adjacent cameras of the 360 degree camera system.

\* \* \* \* \*

UNITED STATES PATENT AND TRADEMARK OFFICE
CERTIFICATE OF CORRECTION

PATENT NO.         : 8,866,913 B1                                           Page 1 of 1
APPLICATION NO.    : 14/248136
DATED              : October 21, 2014
INVENTOR(S)        : Hsieh It is certified that error appears in the above-identified patent and that said Letters Patent is hereby corrected as shown below:

In the Specification
Column 1, Line 64, "exemplary a camera" should read --exemplary camera--;
Column 3, Line 6, "exemplary a camera" should read --exemplary camera--;
Column 4, Line 54, "bested" should read --best--;
Column 6, Line 12, "analyses" should read --analyzes--;
Column 6, Line 32, "analyses" should read --analyzes--;
Column 6, Line 47, "analyses" should read --analyzes--;
Column 7, Line 31, "analyses" should read --analyzes--.

Signed and Sealed this
Fourteenth Day of July, 2015

Michelle K. Lee
*Director of the United States Patent and Trademark Office*